United States Patent
Takao

(10) Patent No.: US 12,384,668 B2
(45) Date of Patent: Aug. 12, 2025

(54) CONTROL METHOD FOR MOBILE OBJECT, MOBILE OBJECT, MOVEMENT CONTROL SYSTEM, AND COMPUTER-READABLE STORAGE MEDIUM

(71) Applicant: Mitsubishi Logisnext Co., Ltd., Nagaokakyo (JP)

(72) Inventor: Kenji Takao, Tokyo (JP)

(73) Assignee: MITSUBISHI LOGISNEXT CO., LTD., Nagaokakyo (JP)

(*) Notice: Subject to any disclaimer, the term of this patent is extended or adjusted under 35 U.S.C. 154(b) by 219 days.

(21) Appl. No.: 18/054,433

(22) Filed: Nov. 10, 2022

(65) Prior Publication Data
US 2023/0202815 A1 Jun. 29, 2023

(30) Foreign Application Priority Data
Dec. 28, 2021 (JP) .................. 2021-214919

(51) Int. Cl.
*B66F 9/075* (2006.01)
*B66F 9/06* (2006.01)
*G05D 1/00* (2024.01)

(52) U.S. Cl.
CPC ............ *B66F 9/0755* (2013.01); *B66F 9/063* (2013.01); *G05D 1/0231* (2013.01)

(58) Field of Classification Search
CPC .......... B66F 9/0755; B66F 9/063; B66F 9/24; G05D 1/0231; G05D 1/0225; G05D 1/024; G05D 1/0234
See application file for complete search history.

(56) References Cited

U.S. PATENT DOCUMENTS 3,631,619 A * 1/1972 Campbell ........ G08G 1/096758
40/564
2018/0258663 A1* 9/2018 Maier ..................... E04H 6/422
(Continued)

FOREIGN PATENT DOCUMENTS

JP 59-112310 A 6/1984
JP 1-302408 A 12/1989
(Continued)

OTHER PUBLICATIONS

English translation of JP-08161039-A (Year: 2024).*
(Continued)

*Primary Examiner* — Scott A Browne
*Assistant Examiner* — Shahira Baajour
(74) *Attorney, Agent, or Firm* — Birch, Stewart, Kolasch & Birch, LLP

(57) ABSTRACT

A control method is for a mobile object that automatically moves in situation where signs each indicating a position are provided on a ceiling of a lateral area on a first direction side with respect to a parking area where a transportation vehicle is parked, along a second direction that intersects the first direction and that is along the parking area. The method includes acquiring positional information of the mobile object by causing the mobile object to detect at least one of the signs; causing the mobile object to move within the lateral area toward the second direction based on the positional information of the mobile object; and causing the mobile object to move toward the parking area by causing the mobile object to turn and move toward an opposite side to the first direction after causing the mobile object to move within the lateral area toward the second direction.

9 Claims, 13 Drawing Sheets

(56) References Cited

U.S. PATENT DOCUMENTS

2019/0156086 A1\* 5/2019 Plummer ........... G06K 7/10722
2021/0271246 A1 9/2021 Takao

FOREIGN PATENT DOCUMENTS

| JP | 8-161039 A | 6/1996 |
|----|-----------|--------|
| JP | 2012-14262 A | 1/2012 |
| JP | 2021-135799 A | 9/2021 |
| KR | 1006698 B1 \* | 1/2011 |
| WO | WO 2008/057504 A2 | 5/2008 |
| WO | WO 2021/194904 A1 | 9/2021 |

OTHER PUBLICATIONS

English translation of JP-2021135799-A (Year: 2024).\*
English translation of KR-1006698-B1 (Year: 2024).\*
Japanese Office Action for Japanese Application No. 2021-214919, dated Dec. 19, 2023, with English translation.
Extended European Search Report for European Application No. 22206573.2, dated Mar. 13, 2023.

\* cited by examiner

FIG.13
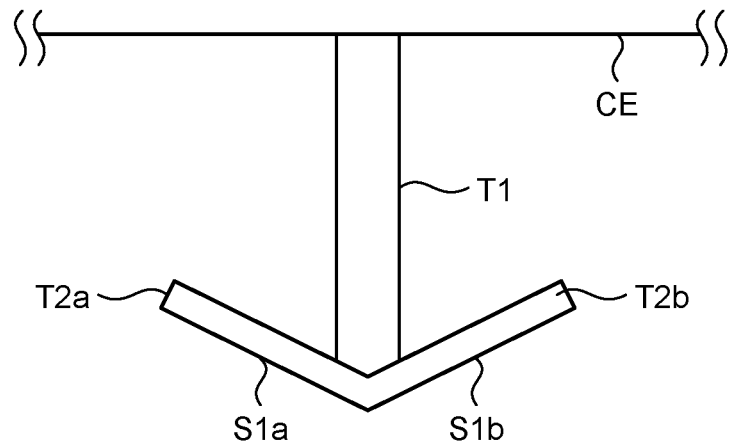
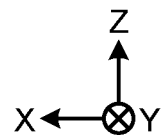
FIG.14
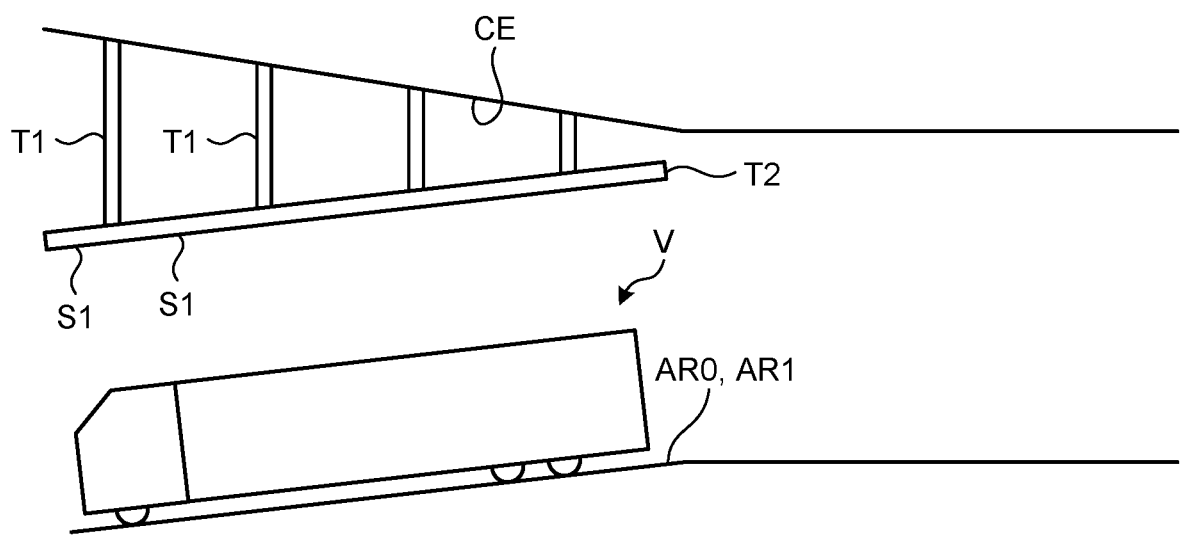
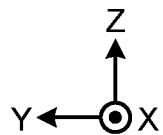

CONTROL METHOD FOR MOBILE OBJECT, MOBILE OBJECT, MOVEMENT CONTROL SYSTEM, AND COMPUTER-READABLE STORAGE MEDIUM

CROSS-REFERENCE TO RELATED APPLICATIONS

The present application claims priority to and incorporates by reference the entire contents of Japanese Patent Application No. 2021-214919 filed in Japan on Dec. 28, 2021.

FIELD

The present disclosure relates to a control method for a mobile object, a mobile object, a movement control system, and a computer-readable storage medium.

BACKGROUND

For example, technologies of automatically moving a mobile object such as a forklift have been known. Such a mobile object usually moves while sequentially detecting its own position. Patent Literature 1 describes a pallet transportation vehicle that transports pallets while recognizing its own position by detecting signs on a floor or ceiling of a workplace.

CITATION LIST

Patent Literature

Patent Literature 1: Japanese Patent Application Laid-open No. H1-302408

SUMMARY

Technical Problem

Here, a mobile object may approach a transportation vehicle that has been parked when unloading or loading from the transportation vehicle. However, in the vicinity of the parking area of the transportation vehicle, there is a risk that a position of the mobile object cannot be properly detected due to transportation vehicles getting in the way because of the traffic of the transportation vehicles or the presence of a plurality of the transportation vehicles.

The present disclosure is intended to solve the problem described above, and an object of the present disclosure is to provide a control method for a mobile object, a mobile object, a movement control system, and a computer-readable storage medium, which enable a position of the mobile object to be properly detected in the vicinity of a parking area of a transportation vehicle.

Solution to Problem

To solve the above problem and achieve the object, a control method according to the present disclosure is for a mobile object that automatically moves in a situation where a plurality of signs each of which indicates a position are provided on a ceiling of a lateral area on a first direction side with respect to a parking area where a transportation vehicle is parked, along a second direction that intersects the first direction and that is along the parking area. The control method includes: acquiring positional information of the mobile object by causing the mobile object to detect at least one of the signs; causing the mobile object to move within the lateral area toward the second direction based on the positional information of the mobile object; and causing the mobile object to move toward the parking area by causing the mobile object to turn and move toward an opposite side to the first direction after causing the mobile object to move within the lateral area toward the second direction.

To solve the above problem and achieve the object, a mobile object that automatically moves according to the present disclosure includes: a self-position acquisition unit configured to acquire positional information of the mobile object by detecting at least one of a plurality of signs provided on a ceiling of a lateral area on a first direction side with respect to a parking area where a transportation vehicle is parked, along a second direction that intersects the first direction and that is along the parking area; and a movement control unit configured to cause the mobile object to move toward the parking area by causing the mobile object to move within the lateral area toward the second direction based on the positional information of the mobile object, and by causing the mobile object to turn and move toward an opposite side to the first direction after causing the mobile object to move within the lateral area toward the second direction.

To solve the above problem and achieve the object, a movement control system according to the present disclosure includes: the above-described mobile object; and the signs.

To solve the above problem and achieve the object, a non-transitory computer-readable storage medium stores a computer program for causing a computer to execute a control method for a mobile object that automatically moves. The computer program includes: acquiring positional information of the mobile object by causing the mobile object to detect at least one of a plurality of signs provided on a ceiling of a lateral area on a first direction side with respect to a parking area where a transportation vehicle is parked, along a second direction that intersects the first direction and that is along the parking area; causing the mobile object to move within the lateral area toward the second direction based on the positional information of the mobile object; and causing the mobile object to move toward the parking area by causing the mobile object to turn and move toward an opposite side to the first direction after causing the mobile object to move within the lateral area toward the second direction.

Advantageous Effects of Invention

According to the present disclosure, the position of the mobile object can be properly detected in the vicinity of the parking area of the transportation vehicle.

BRIEF DESCRIPTION OF DRAWINGS

FIG. 13 is a diagram schematically illustrating still another example of a shape of a sign.

FIG. 14 is a diagram schematically illustrating another example of the signs.

DESCRIPTION OF EMBODIMENTS

Suitable embodiments of the present disclosure are described in detail below with reference to the accompanying drawings. The present disclosure is not limited by these embodiments, and in a case where there are a plurality of embodiments, the present disclosure includes a configuration in which individual embodiments are combined.

Overall Configuration of Movement Control System

Figure 1:
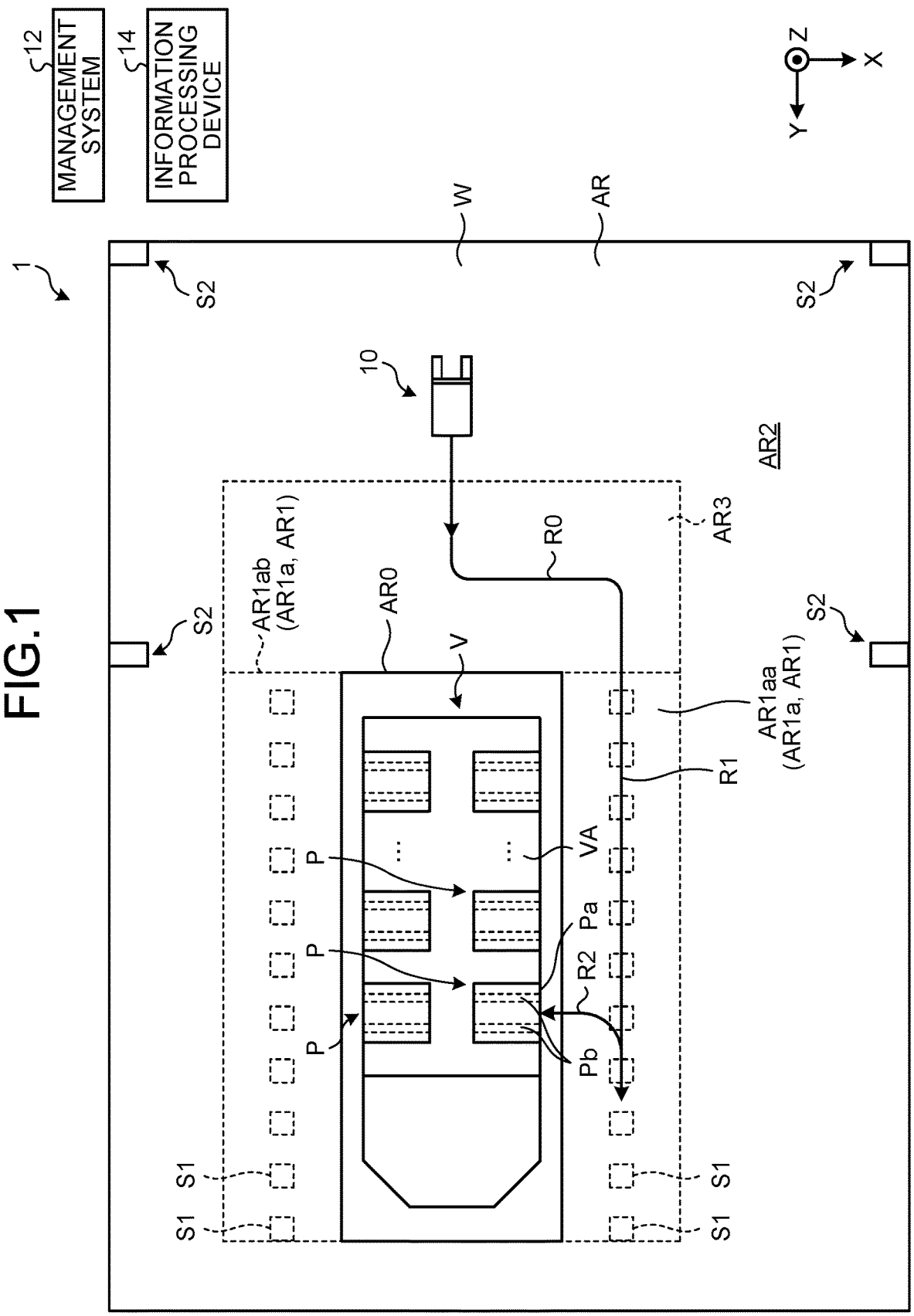
FIG. 1 is a diagram schematically illustrating a movement control system according to the present embodiment.

FIG. 1 is a diagram schematically illustrating a movement control system according to the present embodiment. As illustrated in FIG. 1, a movement control system 1 according to the present embodiment includes a mobile object 10, a management system 12, an information processing device 14, and signs S1. The movement control system 1 is a system for controlling the movement of the mobile object 10 belonging to a facility W. The facility W is a facility for logistics management, for example, a warehouse. In the movement control system 1, the mobile object 10 approaches a transportation vehicle V that has been parked in a parking area AR0 in the facility W. The transportation vehicle V is a mobile object that transports a loaded target object P into and out of an inner section and an outer section of the facility W. The transportation vehicle V arrives at the facility W with the target object P being loaded or moves to another location with the target object P, which has been loaded at the facility W. The transportation vehicle V is a truck in the present embodiment, but is not limited thereto. The transportation vehicle V may be any mobile object that transports the target object P, for example, a railroad vehicle. In the present embodiment, the target object P is an object to be transported, with a load being loaded on a pallet. The target object P has an opening Pb in a front surface Pa into which a fork 24 of the mobile object 10 described below is inserted. However, the target object P is not limited to the object with the load being loaded on the pallet, may be in any form, and may be, for example, only the load without the pallet. Hereafter, the floor surface of the facility W will be referred to as an area AR, a direction along the area AR will be referred to as a direction X (a first direction), and a direction along the area AR and intersecting the direction X will be referred to as a direction Y (a second direction). In the present embodiment, the direction Y is orthogonal to the direction X. The direction X and the direction Y may be directions along the horizontal plane. A direction orthogonal to the direction X and the direction Y, more specifically, a direction toward a vertical upward direction will be referred to as a direction Z.

Transportation Vehicle

Figure 2:
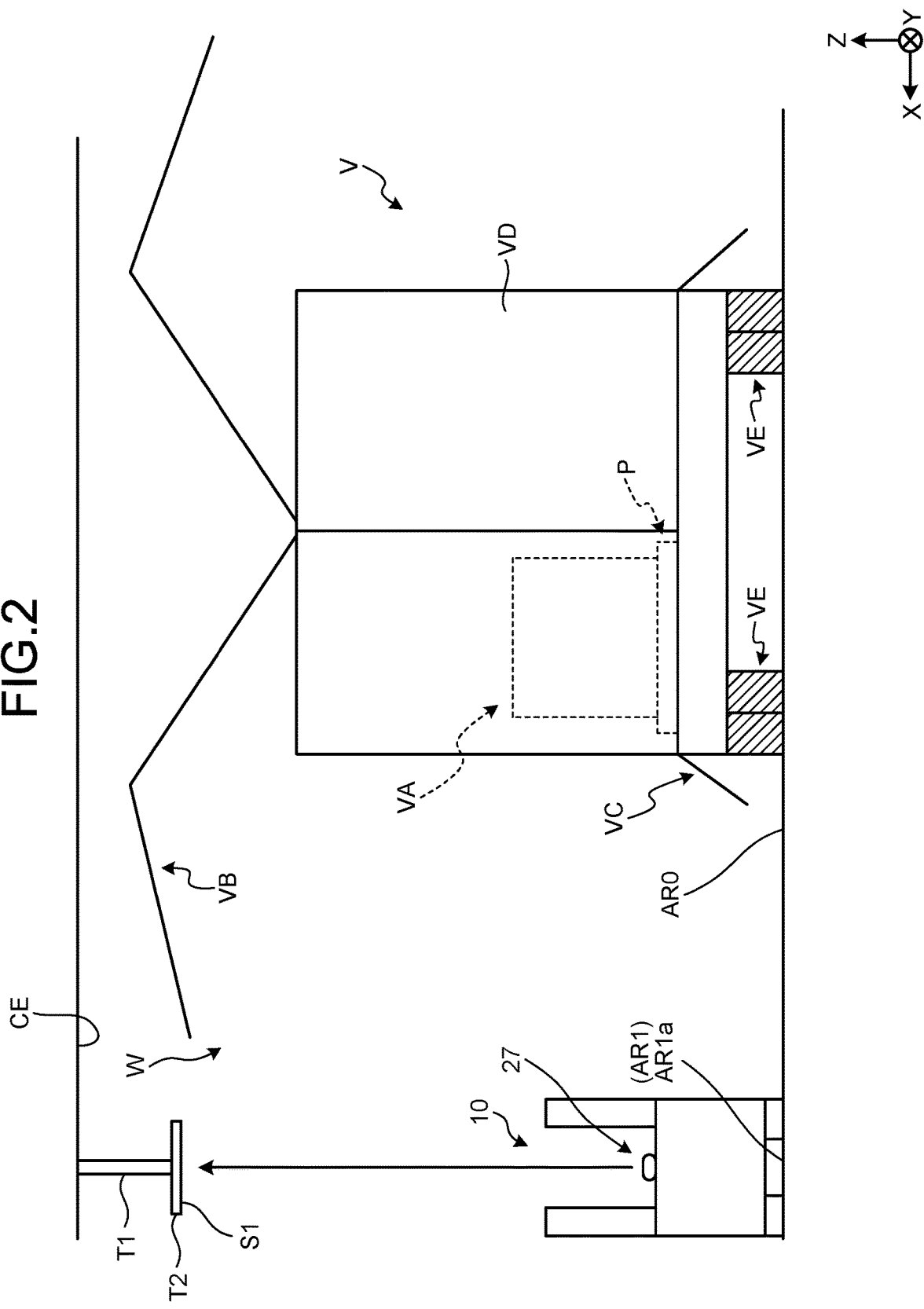
FIG. 2 is a diagram schematically illustrating a transportation vehicle.

The transportation vehicle V will be more specifically described. FIG. 2 is a diagram schematically illustrating a transportation vehicle. FIG. 2 is a diagram schematically illustrating the transportation vehicle V parked in the parking area AR0, which is viewed from the rear end side of the transportation vehicle V. As illustrated in FIG. 2, the transportation vehicle V includes a storage compartment VA, side doors VB, gate units VC, rear doors VD, and tires VE. The storage compartment VA is a space formed on a loading platform of the vehicle V where the target object P is stored. The side doors VB are doors on both lateral sides of the storage compartment VA. In a case where the side doors VB are released, the storage compartment VA communicates with the outside, and the target object P can be carried into and out of the storage compartment VA. In the present embodiment, the side doors VB are provided on both sides, but are not limited thereto, and a door may be provided on only one side. The gate units VC are gates provided near the bottom of both lateral sides of the storage compartment VA. The rear doors VD are doors provided at the rear side of the storage compartment VA. In a case where the rear doors VD are opened, the storage compartment VA also communicates with the outside, and the target object P can be carried into and out of the storage compartment VA. In the present embodiment, the side doors VB are opened, and the mobile object 10 approaches from both lateral sides of the transportation vehicle V to load and unload the target object P from both lateral sides. However, the present disclosure is not limited thereto, and for example, the target object P may be loaded and unloaded from only one lateral side of the transportation vehicle V, and the target object P may be loaded and unloaded from the rear side of the transportation vehicle V. The configuration of the transportation vehicle V is also not limited to that described in FIG. 2.

Parking Area AR0

The parking area AR0 illustrated in FIG. 1 will be more specifically described. The parking area AR0 is an area where the transportation vehicle V is parked, which is provided within an area AR of the facility W. Within the parking area AR0, the transportation vehicle V is preferably parked so that the entire transportation vehicle V exists within the parking area AR0. In an example in FIG. 1, there is one parking area AR0, but there may be a plurality of the parking areas AR0.

The parking area AR0 is preset as an area where the transportation vehicle V is parked. In other words, a position (coordinate), a shape, and a size of the parking area AR0 are preset, and the parking area AR0 may be demarcated by white lines, for example. The parking area AR0 is preferably set in a shape and a size through which an orientation of the transportation vehicle V to be parked within the parking area AR0 can be defined. In the present embodiment, the parking area AR0 is set in such a shape and size that a direction from the rear end to the front end of the transportation vehicle V is oriented along the direction Y in a case where the transportation vehicle V is parked within the parking area AR0. For example, in the example in FIG. 1, the parking area AR0 is a rectangular area extending along the direction X and the direction Y, and a length of the parking area AR0 in the direction Y is set to be longer than a length of the parking area AR0 in the direction X. According to this, the transportation vehicle V, which is formed to be longer in the front-rear direction than in the left-right direction, will be parked within the parking area AR0 so that the direction from the rear end to the front end of the transportation vehicle V is oriented along the direction Y. Therefore, the transportation vehicle V is oriented so that one of its lateral sides faces the direction X and the other of its lateral sides faces the opposite side to the direction X within the parking area AR0, and the mobile object 10 approaches the transportation vehicle V from the side of the direction X or the opposite side of the direction X.

A plurality of the target objects P are disposed in the storage compartment VA of the transportation vehicle V along the front-rear direction of the transportation vehicle V (from the rear end to the front end of the transportation vehicle V). Therefore, within the parking area AR0, the target objects P are disposed in the storage compartment VA to be aligned along the direction Y. In addition, in the present embodiment, the target objects P in the storage compartment VA are also disposed to be aligned along the left-right direction (the X direction in the parking area AR0) of the vehicle V. In the example in FIG. 1, within the parking area AR0, the target objects P are aligned along the direction Y and aligned in two rows along the direction X. Each of the target objects P is disposed so that a front surface Pa thereof faces outward in the left-right direction of the transportation vehicle V. That is, it can be said that each of the target objects P is disposed within the parking area AR0 so that the front surface Pa faces a direction to which the mobile object 10 approaches (faces the direction X side or the opposite side to the direction X). For example, a target object P in the row on the direction X side is disposed so that the front surface Pa faces the direction X side, and a target object P in the row on the opposite side to the direction X is disposed so that the front surface Pa faces the opposite side to the direction X. However, the arrangement and number of the target objects P, and the orientation of the front surface Pa are not limited to the above description, and any arrangement and number of the target objects P, and any orientation of the front surface Pa may be adopted.

First Area and Second Area

As illustrated in FIG. 1, the area AR includes a first area AR1 and a second area AR2. The first area AR1 is an area positioned closer to the parking area AR0 than the second area AR2 is, and is an area where the mobile object 10 detects its own position by detecting signs S1, as described in detail below. The first area AR1 can also be an area within a predetermined distance from the signs S1 provided on a ceiling. The second area AR2 is an area where the mobile object 10 detects its own position by a method other than the detecting of the signs S1. The second area AR2 can also be an area out of a predetermined distance from the signs S1 provided on a ceiling. The signs S1 and self-position detection of the mobile object 10 will be described later.

The first area AR1 includes the parking area AR0 and a lateral area AR1a. The lateral area AR1a is an area positioned on the direction side where the mobile object 10 approaches the parking area AR0, as illustrated in FIG. 1. In the present embodiment, since the mobile object 10 approaches the transportation vehicle V in the parking area AR0 from the direction X, it can be said that the lateral area AR1a is positioned on the direction X side with respect to the parking area AR0. In addition, in the example of the present embodiment, since the mobile object 10 can also approach the transportation vehicle V from the opposite side to the direction X, another lateral area AR1a also exists on the opposite side to the lateral area AR1a positioned on the direction X side with respect to the parking area AR0. In other words, in the present embodiment, it can be said that a lateral area AR1aa is set on the direction X side with respect to the parking area AR0, and a lateral area AR1ab is set on the opposite side to the direction X with respect to the parking area AR0. The lateral area AR1aa is adjacent to the parking area AR0 on the direction X side and extends along the direction Y from a position of an end part of the parking area AR0 on the direction X side opposite to the direction Y to a position of an end part of the parking area AR0 on the direction X side in the direction Y. Similarly, the lateral area AR1ab is adjacent to the parking area AR0 on the opposite side to the direction X and extends along the direction Y from a position of an end part of the parking area AR0 on the opposite side to the direction Y side, on the opposite side to the direction X, to a position of an end part of the parking area AR0 on the direction Y side, on the opposite side to the direction X. However, the sizes and shapes of the lateral areas AR1aa and AR1ab illustrated in FIG. 1 are examples, and the lateral area AR1aa may be an area, which has any size and shape and is adjacent to the parking area AR0 on the direction X side, and the lateral area AR1ab may be an area, which has any size and shape and is adjacent to the parking area AR0 on the opposite side to the direction X.

In the present embodiment, since the first area AR1 includes only the parking area AR0 and the lateral area AR1a, an area other than the parking area AR0 and the lateral area AR1a in the area AR is the second area AR2. However, the first area AR1 may be any area including the lateral area AR1a. For example, a rear area AR3 on the opposite side to the parking area AR0 in the Y direction may also be included in the first area AR1.

Signs

As illustrated in FIGS. 1 and 2, the signs S1 are provided on a ceiling CE of the facility W in the lateral area AR1a. That is, the signs S1 are provided on the ceiling CE of the facility W in an area overlapping the lateral area AR1a in the Z direction. As illustrated in FIG. 1, a plurality of the signs S1 are provided on the ceiling CE of the lateral area AR1a, along the direction Y (along the parking area AR0). Since a global path R0 described below, which is a movement path of the mobile object 10, is set along the lateral area AR1a in the Y direction, it can be said that the signs S1 are aligned along the global path R0 in the lateral area AR1a.

The signs S1 are signs that include positional information on the signs S1. The positional information on the signs S1 is information indicating positions (coordinates) where the signs S1 are installed in a coordinate system of the area AR (facility W). Although the details will be described below, the mobile object 10 obtains the positional information of the signs S1 by using a sensor 27, which detects the signs S1. The signs S1 are marks that indicate its own positional information. For example, each of the signs S1 may be a QR code (registered trademark) or an augmented reality (AR) marker, which indicates positional information, but the signs S1 are not limited thereto, and may be any signs including positional information.

Figure 3:
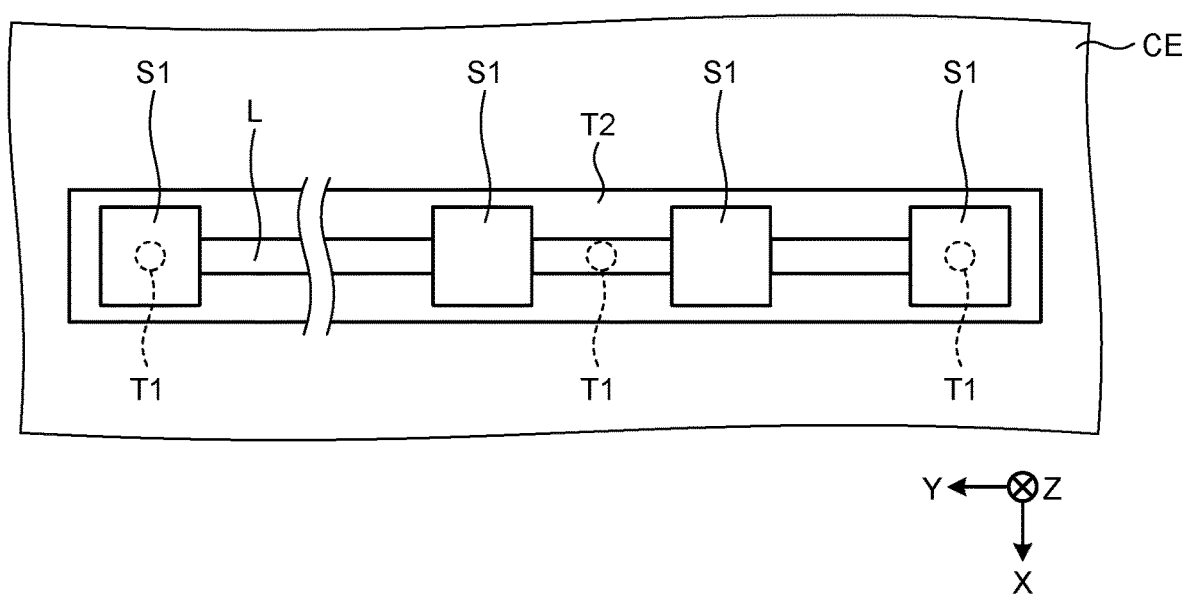
FIG. 3 is a diagram schematically illustrating signs.

FIG. 3 is a diagram schematically illustrating the signs. FIG. 3 is the diagram illustrating a case where the signs S1 are viewed from the opposite side of the Z direction. As illustrated in FIGS. 2 and 3, the signs S1 are provided on the ceiling CE of the lateral area AR1a so as to face the opposite side to the Z direction (vertically downward). In the example of the present embodiment, a plurality of axial portions T1 extending toward the opposite side to the Z direction are provided on the ceiling CE of the lateral area AR1a along the Y direction, and plate portions T2 are respectively connected to tip ends of the axial portions T1, on the opposite side to the Z direction. Each of the plate portions T2 is a plate-like member extending along the Y direction, and the signs S1 are provided on surfaces T2a on the opposite side to the Z direction along the Y direction. The plate portions T2 are disposed so that the surfaces T2a are parallel to the lateral area AR1a (floor). Therefore, it can be said that the signs S1 are also provided to be parallel to the lateral area AR1a.

However, the form in which the signs S1 are provided is not limited thereto, and any form may be adopted. For example, the signs S1 are not limited to being provided on the plate portions T2; the signs S1 may be provided directly on the ceiling CE. The signs S1 are not limited to being parallel to the lateral area AR1a, and may be provided to be inclined with respect to the lateral area AR1a.

As illustrated in FIG. 3, a line L is formed between adjacent signs S1 in the Y direction, on the surfaces T2a of the plate portions T2. The line L is a linear marker that can be detected by the sensor 27 of the mobile object 10, for example, a white line. The line L is formed to extend along the Y direction. In the present embodiment, since the line L is provided at each position between the adjacent signs S1 in the Y direction, it can be said that the line L extends along the Y direction from a sign S1 on the opposite side farthest from the Y direction to a sign S1 on the side closest to the Y direction. However, the line L is not limited to a line provided over the entire section from the sign S1 on the opposite side farthest from the Y direction to the sign S1 on the side closest to the Y direction, and may be provided only in a part of the section. The line L is not a necessary component.

As explained above, although the signs S1 are provided on the ceiling CE of the lateral area AR1a, it is not limited that the signs S1 are provided on only the ceiling CE of the lateral area AR1a, and may also be provided on the ceiling of areas other than the lateral area AR1a within the first area AR1. For example, in a case where the first area AR1 includes the rear area AR3, the signs S1 may also be provided on the ceiling CE of the rear area AR3 along the global path R0 in the rear area AR3. That is, it can be said that the signs S1 are provided on the ceiling of at least a part of the area in the first area AR1, along the global path R0. On the other hand, the signs S1 may not be provided on the ceiling of the second area AR2.

Mobile Object

The mobile object 10 is a device that can automatically move. In the present embodiment, the mobile object 10 is a forklift, and more specifically, a so-called automated guided vehicle (AGV) or automated guided forklift (AGF). As illustrated in the example of FIG. 1, the mobile object 10 moves over the area AR in the facility W. The mobile object 10 approaches the transportation vehicle V that has been parked in the parking area AR0 to unload (pick up) a target object P loaded on the transportation vehicle V or to load (drop) a target object P that has been loaded on the mobile object 10 onto the transportation vehicle V. Hereinbelow, a case where the mobile object 10 approaches the transportation vehicle V from the X direction side of the parking area AR0 through the lateral area AR1a (lateral area AR1aa) on the X direction side of the parking area AR0 and unloads the target objects P loaded on the transportation vehicle V will be described as an example.

Figure 4:
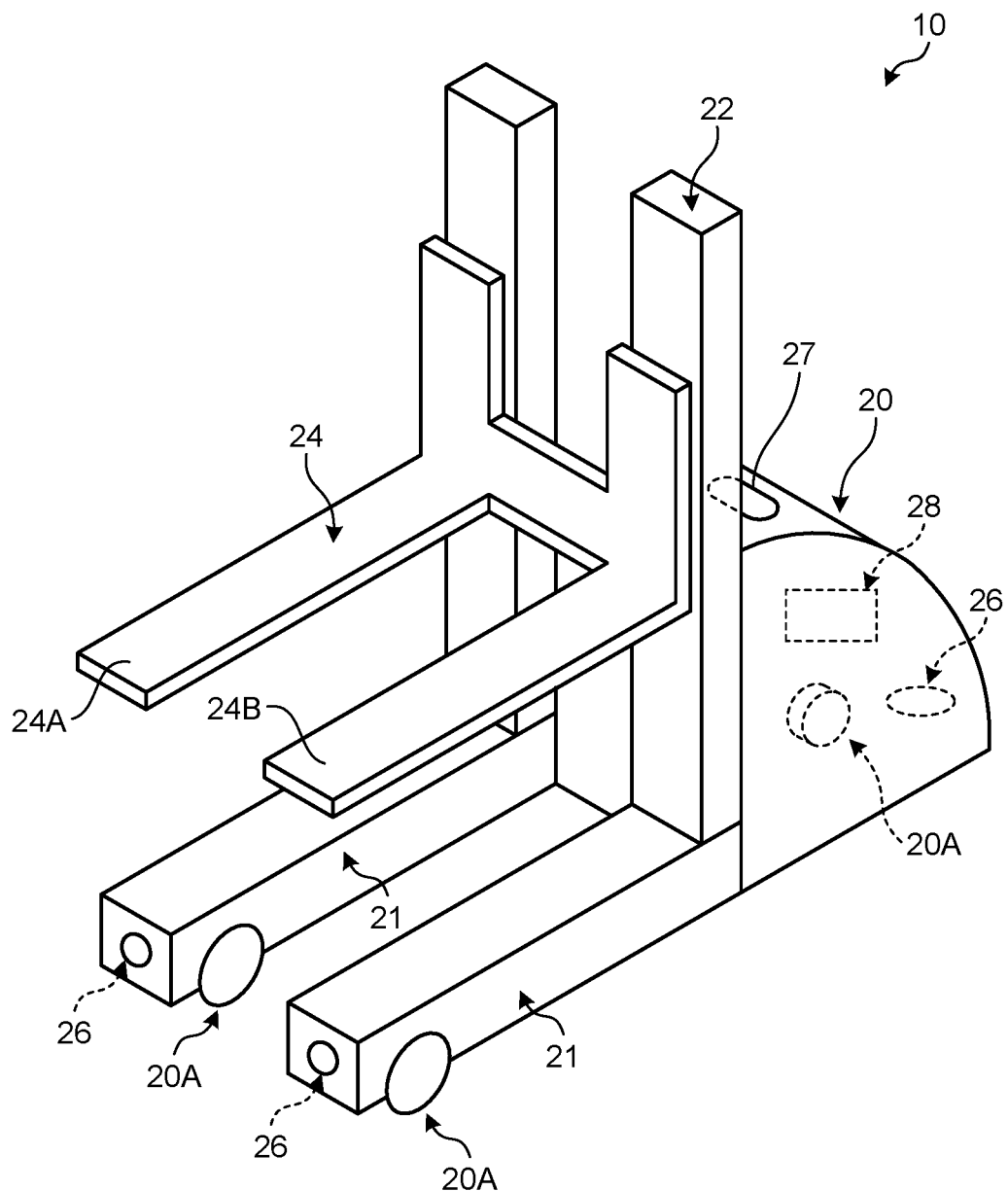
FIG. 4 is a diagram schematically illustrating a configuration of a mobile object.

FIG. 4 is a diagram schematically illustrating a configuration of the mobile object. As illustrated in FIG. 4, the mobile object 10 is provided with a vehicle body 20, vehicle wheels 20A, straddle legs 21, masts 22, a fork 24, sensors 26 and 27, and a control device 28. The straddle legs 21 are a pair of shaft-like members provided at one end in the front-rear direction of the vehicle body 20 and protruding from the vehicle body 20. The vehicle wheels 20A are respectively provided at front ends of the straddle legs 21 and the vehicle body 20. That is, a total of three vehicle wheels 20A are provided, but any positions where the vehicle wheels 20A are provided and any number of vehicle wheels 20A may be adopted. The masts 22 are movably attached to the straddle legs 21 and move in the front-rear direction of the vehicle body 20. The masts 22 extend along the vertical direction (here, the direction Z), which is orthogonal to the front-rear direction. The fork 24 is movably attached to the masts 22 in the direction Z. The fork 24 may also be movable in the lateral direction (the direction intersecting the vertical direction and the front-rear direction) of the vehicle body 20 with respect to the masts 22. The fork 24 has a pair of claws 24A and 24B. The claws 24A and 24B extend from the masts 22 toward the front of the vehicle body 20. The claws 24A and 24B are disposed laterally on the masts 22 and disposed apart from each other. Hereinafter, in the front-rear direction, a direction where the fork 24 is provided in the mobile object 10 is referred to as the front direction, and a direction where the fork 24 is not provided is referred to as the rear direction.

The sensors 26 detect at least one of a position or a posture of an object present in the vicinity of the vehicle body 20. It can be said that the sensors 26 detect a position of the object relative to the mobile object 10 and a posture of the object relative to the mobile object 10. In the present embodiment, the sensors 26 are respectively provided at the front ends of the straddle legs 21 and on the rear side of the vehicle body 20. However, positions of the sensors 26 are not limited thereto, and the sensors 26 may be provided at any positions, and any number of the sensors 26 may be provided. For example, a safety sensor provided in the mobile object 10 may be diverted as one sensor 26. By diverting the safety sensor, there is no need to provide a new sensor.

The sensors 26 are, for example, sensors each of which emits a laser beam. Each of the sensor 26 emits a laser beam while scanning in one direction (here, in the horizontal direction) and detects a position and an orientation of the object based on light reflected after the laser beam has been emitted. That is, it can be said that each of the sensors 26 is a so-called two-dimensional (2D)-light detection and ranging (LiDAR). The sensors 26 are not limited to the above-mentioned examples, and each of the sensors 26 may be a sensor that detects the object by any method, may be a so-called three-dimensional (3D)-LiDAR that carries out scanning in multiple directions, or may be a camera, for example.

The sensor 27 is a sensor that detects the signs S1. The sensor 27 is provided so as to face the Z direction side, and the Z direction side of the mobile object 10 is a detection area. In the example of the present embodiment, the sensor 27 is provided on the Z direction side of the vehicle body 20, but the sensor 27 may be provided at any position.

In the present embodiment, the sensor 27 is a camera, and the Z direction side of the mobile object 10 is an imaging area (detection area). The sensor 27 detects the signs S1 by imaging the signs S1. In other words, it can be said that the sensor 27 has detected the signs S1 in a case where the sensor 27 successively captures images in the imaging area and the signs S1 are imaged in the imaging area, that is, the sensor 27 receives visible light reflected by the signs S1. However, the sensor 27 is not limited to the camera, and may be any sensor capable of detecting the signs S1 and acquiring positional information of the signs S1. The sensor 27 is not limited to a sensor different from the sensors 26, and the sensors 26 or the safety sensor may be used as the sensor 27.

The control device 28 controls the movement of the mobile object 10. The control device 28 will be described later.

Management System

Figure 5:
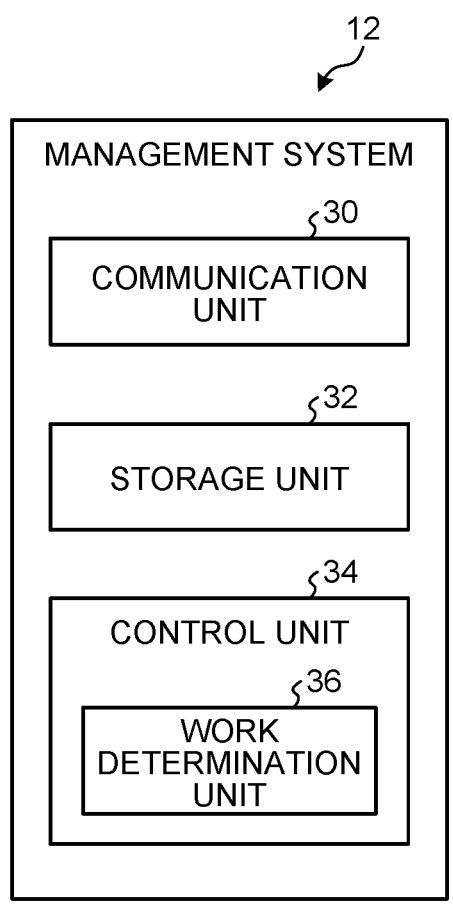
FIG. 5 is a block diagram schematically illustrating a management system.

FIG. 5 is a block diagram schematically illustrating a management system. A management system 12 is a system that manages logistics at the facility W. The management system 12 is a warehouse management system (WMS) in the present embodiment, but is not limited to WMS, and any system may be adopted. For example, a back-end system such as other production management systems can also be adopted. Any position where the management system 12 is provided can be adopted, and the management system 12 may be provided in the facility W, or may be provided away from the facility W to manage the facility W from a remote position. The management system 12 is a computer and includes a communication unit 30, a storage unit 32, and a control unit 34, as illustrated in FIG. 5.

The communication unit 30 is a module used by the control unit 34 to communicate with an external device, such as the information processing device 14, and may include, for example, an antenna. A communication method performed by the communication unit 30 is wireless communication in the present embodiment, but any communication method may be adopted. The storage unit 32 is a memory that stores various pieces of information such as contents of calculations and computer programs of the control unit 34, and includes at least one of, for example, a random access memory (RAM), a main storage device such as a read only memory (ROM), and an external storage device such as a hard disk drive (HDD).

The control unit 34 is an arithmetic device and includes an arithmetic circuitry, such as a central processing unit (CPU). The control unit 34 includes a work determination unit 36. The control unit 34 reads out a computer program (software) from the storage unit 32 and executes the computer program to implement the work determination unit 36 and performs processing thereof. The control unit 34 may execute processing by a single CPU, or may be equipped with a plurality of CPUs to execute the processing by those CPUs. The work determination unit 36 may be implemented through a hardware circuitry. The computer program for the control unit 34, which is stored in the storage unit 32, may be stored in a (non-transitory) computer-readable storage medium that can be read by the management system 12.

The work determination unit 36 determines a target object P to be transported. Specifically, the work determination unit 36 determines a work content indicating information of the target object P to be transported, based on an input work plan, for example. It can be said that the work content is information that specifies the target object P to be transported. In the example of the present embodiment, the work content determines which target object P present in which facility is to be transported, by when, and to where, as a work content. That is, the work determination unit 36 is information indicating a facility where a target object P to be transported is stored, the target object P to be transported, a transporting destination of the target object P, and a timing when the target object P is transported. The work determination unit 36 transmits the determined work content to the information processing device 14 via the communication unit 30. The work determination unit 36 is not a necessary component of the present embodiment.

Information Processing Device

Figure 6:
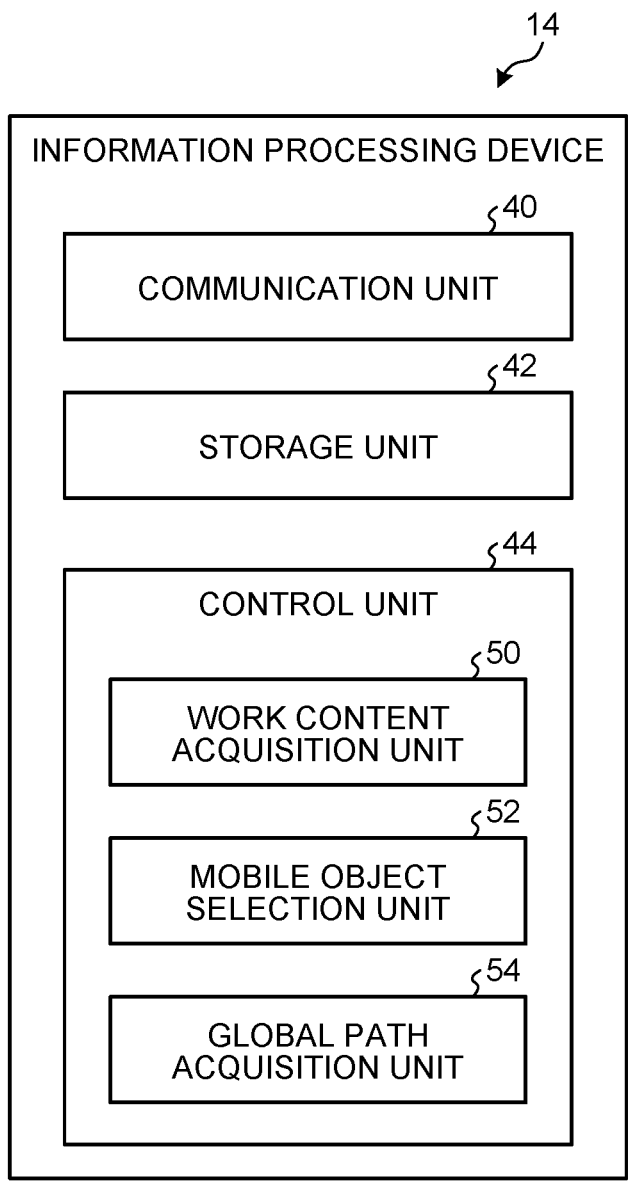
FIG. 6 is a block diagram schematically illustrating an information processing device.

FIG. 6 is a block diagram schematically illustrating an information processing device. The information processing device 14 is provided in the facility W and is at least a device that calculates information related to the movement of the mobile object 10, and other information, that is, a so-called ground system. The information processing device 14 is a computer and includes a communication unit 40, a storage unit 42, and a control unit 44, as illustrated in FIG. 6. The communication unit 40 is a module used by the control unit 44 to communicate with an external device, such as the management system 12 or the mobile object 10, and may include, for example, an antenna. A communication method performed by the communication unit 40 is wireless communication in the present embodiment, but any communication method may be adopted. The storage unit 42 is a memory that stores various pieces of information such as contents of calculations and computer programs of the control unit 44, and includes at least one of, for example, a RAM, a main storage device such as a ROM, and an external storage device such as an HDD. In the present embodiment, the management system 12 and the information processing device 14 are separate devices, but they may be one device. That is, the management system 12 may have at least some of the functions of the information processing device 14 in combination, or the information processing device 14 may have at least some of the functions of the management system 12 in combination.

The control unit 44 is an arithmetic device and includes an arithmetic circuitry, such as CPU. The control unit 44 includes a work content acquisition unit 50, a mobile object selection unit 52, and a global path acquisition unit 54. The control unit 44 reads out a computer program (software) from the storage unit 42 and executes the computer program to implement the work content acquisition unit 50, the mobile object selection unit 52, and the global path acquisition unit 54 and performs processing thereof. The control unit 44 may execute processing by a single CPU, or may be equipped with a plurality of CPUs to execute the processing by those CPUs. At least one of the work content acquisition unit 50, the mobile object selection unit 52, or the global path acquisition unit 54 may be implemented through a hardware circuitry. The computer program for the control unit 44, which is stored in the storage unit 42, may be stored in a (non-transitory) computer-readable storage medium that can be read by the information processing device 14.

Work Content Acquisition Unit and Mobile object Selection Unit

The work content acquisition unit 50 acquires information on the work content determined by the management system 12, that is, information on the target object P to be transported. The work content acquisition unit 50 specifies the parking area AR0 of the transportation vehicle V on which the target object P has been loaded, from the information on the target object P in the work content. For example, the target object P, the transportation vehicle V on which the target object P is loaded, and the parking area AR0 of the transportation vehicle V are stored in the storage unit 42 in association with each other, and the work content acquisition unit 50 specifies the parking area AR0 by reading out the information from the storage unit 42. The mobile object selection unit 52 selects a target mobile object 10. The mobile object selection unit 52 selects the target mobile object 10 among a plurality of the mobile objects 10 belonging to the facility W. The mobile object selection unit 52 may select the target mobile object 10 by any method. For example, based on the parking area AR0 specified by the work content acquisition unit 50, a mobile object 10 suitable for transporting the target object P in the parking area AR0 may be selected as the target mobile object 10. The work content acquisition unit 50 and the mobile object selection unit 52 are not necessary components of the present embodiment.

Global Path Acquisition Unit

The global path acquisition unit 54 acquires information on the global path R0 toward the parking area AR0, which is specified by the work content acquisition unit 50. The global path acquisition unit 54 transmits the acquired information on the global path R0 to the target mobile object 10 via the communication unit 40. The global path R0 is predetermined for each parking area AR0, for example. The global path acquisition unit 54 acquires, for example from the storage unit 42, the global path R0 set with respect to the parking area AR0, which is specified by the work content acquisition unit 50. The global path R0 is set based on a coordinate system in a two-dimensional plane on the area AR (a coordinate system of the area AR). Thus, the global path R0 is a track in a coordinate system of the area AR, but is not limited thereto, and the global path R0 may be a track in a global coordinate system.

The global path R0 is predetermined based on map information of the facility W. The map information of the facility W is information that includes positional information on obstacles (such as posts) installed in the facility W and pathways along which the mobile object 10 can travel, and it can be said that the map information is information that indicates an area within the area AR where the mobile object 10 can move. The global path R0 may be set based on information of a vehicle specification of the mobile object 10 as well as the map information of the facility W. The information of the vehicle specification is, for example, a specification that affects a path along which the mobile object 10 can travel, such as a size and a minimum turning radius of the mobile object 10. In a case where the global path R0 is also based on the information of the vehicle specification, the global path R0 may be set for each mobile object. The global path R0 may be set by a person based on the map information or the information of the vehicle specification, or may be set automatically by a device such as the information processing device 14 based on the map information or the information of the vehicle specification. In a case of setting the global path R0 automatically, for example, a point (waypoint) to be passed may be specified, and in this case, it is possible to set the global path R0 as a path that is a shortest distance through the point to be passed and avoids obstacles (fixed objects such as walls).

The global path acquisition unit 54 may set the global path R0 without reading out the preset global path R0. In this case, the global path acquisition unit 54 may generate, as the global path R0, a path toward the parking area AR0 from the current position of the target mobile object 10 based on the positional information of the target mobile object 10, the positional information of the parking area AR0, and the map information of the facility W.

Control Device of Mobile Object

Figure 7:
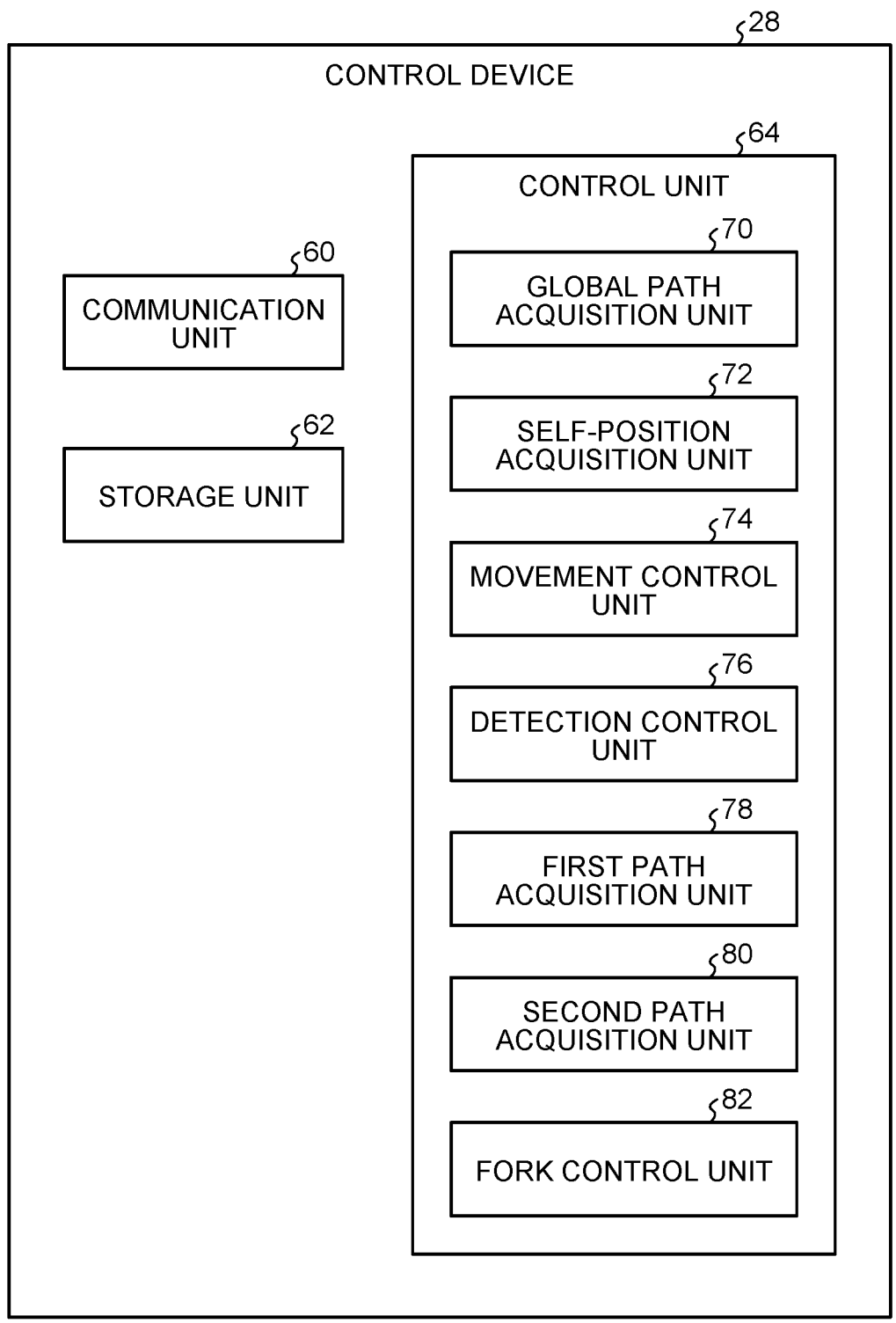
FIG. 7 is a block diagram schematically illustrating a control device for the mobile object.

Next, the control device 28 of the mobile object 10 will be described. FIG. 7 is a block diagram schematically illustrating the control device for the mobile object. The control device 28 controls the mobile object 10 and causes the mobile object 10 to approach the transportation vehicle V in the parking area AR0. The control device 28 is a computer and includes a communication unit 60, a storage unit 62, and a control unit 64, as illustrated in FIG. 7. The communication unit 60 is a module used by the control unit 64 to communicate with an external device, such as the information processing device 14, and may include, for example, an antenna. A communication method performed by the communication unit 60 is wireless communication in the present embodiment, but any communication method may be adopted. The storage unit 62 is a memory that stores various pieces of information such as contents of calculations and computer programs of the control unit 64, and includes at least one of, for example, a RAM, a main storage device such as a ROM, and an external storage device such as an HDD.

The control unit 64 is an arithmetic device and includes an arithmetic circuitry, such as CPU. The control unit 64 includes a global path acquisition unit 70, a self-position acquisition unit 72, a movement control unit 74, a detection control unit 76, a first path acquisition unit 78, a second path acquisition unit 80, and a fork control unit 82. The control unit 64 reads out a computer program (software) from the storage unit 62 and executes the computer program (software) to implement the global path acquisition unit 70, the self-position acquisition unit 72, the movement control unit 74, the detection control unit 76, the first path acquisition unit 78, the second path acquisition unit 80, and the fork control unit 82, thereby executing the processing. The control unit 64 may execute processing by a single CPU, or may be equipped with a plurality of CPUs to execute the processing by those CPUs. At least some of the global path acquisition unit 70, the self-position acquisition unit 72, the movement control unit 74, the detection control unit 76, the first path acquisition unit 78, the second path acquisition unit 80, and the fork control unit 82 may be implemented by a hardware circuitry. The computer program for the control unit 64, which is stored in the storage unit 62, may be stored in a (non-transitory) computer-readable storage medium that can be read by the control device 28.

Global Path Acquisition Unit

The global path acquisition unit 70 acquires information on the global path R0. The global path acquisition unit 70 may acquire the information on the global path R0 from the information processing device 14 when the mobile object 10 is selected as a work target, or may read out information on the global path R0, which has been stored in the storage unit 62 in advance. The global path acquisition unit 70 is not limited to the acquisition of the global path R0 from the information processing device 14, and the global path acquisition unit 70 itself may also set the global path R0.

Self-Position Acquisition Unit

The self-position acquisition unit 72 sequentially acquires the positional information on the mobile object 10. The positional information on the mobile object 10 is information indicating a position (coordinate) of the mobile object 10 in the coordinate system of the area AR. The self-position acquisition unit 72 acquires positional information of the mobile object 10 by a first detection method of detecting the signs S1 in a case where the mobile object 10 is positioned in the first area AR1 (such as the lateral area AR1a), and acquires positional information of the mobile object 10 by a second detection method other than the first detection method in a case where the mobile object 10 is positioned outside the first area AR1 (such as the lateral area AR1a). Processing of the self-position acquisition unit 72 will be described later.

Movement Control Unit

The movement control unit 74 controls the movement of the mobile object 10 by controlling movement mechanisms of the mobile object 10, such as a drive unit, steering, or other movement mechanisms. Specific processing performed by the movement control unit 74 will be described later.

Detection Control Unit

The detection control unit 76 causes the sensor 26 to detect a position and a posture of the transportation vehicle V and detect a position and a posture of the target object P, and acquires detection results of the position and posture of the transportation vehicle V, and the position and posture of the target object P by the sensor 26. Specific processing performed by the detection control unit 76 will be described later.

First Path Acquisition Unit

The first path acquisition unit 78 acquires information on a first path R1, which is set based on the position and posture of the transportation vehicle V. Specific processing performed by the first path acquisition unit 78 will be described later.

Second Path Acquisition Unit

The second path acquisition unit 80 acquires information on a second path R2, which is set based on the position and posture of the target object P. Specific processing performed by the second path acquisition unit 80 will be described later.

Fork Control Unit

The fork control unit 82 controls an operation of the fork 24 of the mobile object 10.

Processing of Control Device

Next, the processing of the control device 28 in a case where the mobile object 10 approaches the transportation vehicle V will be described.

Movement Along Global Path

Figure 8:
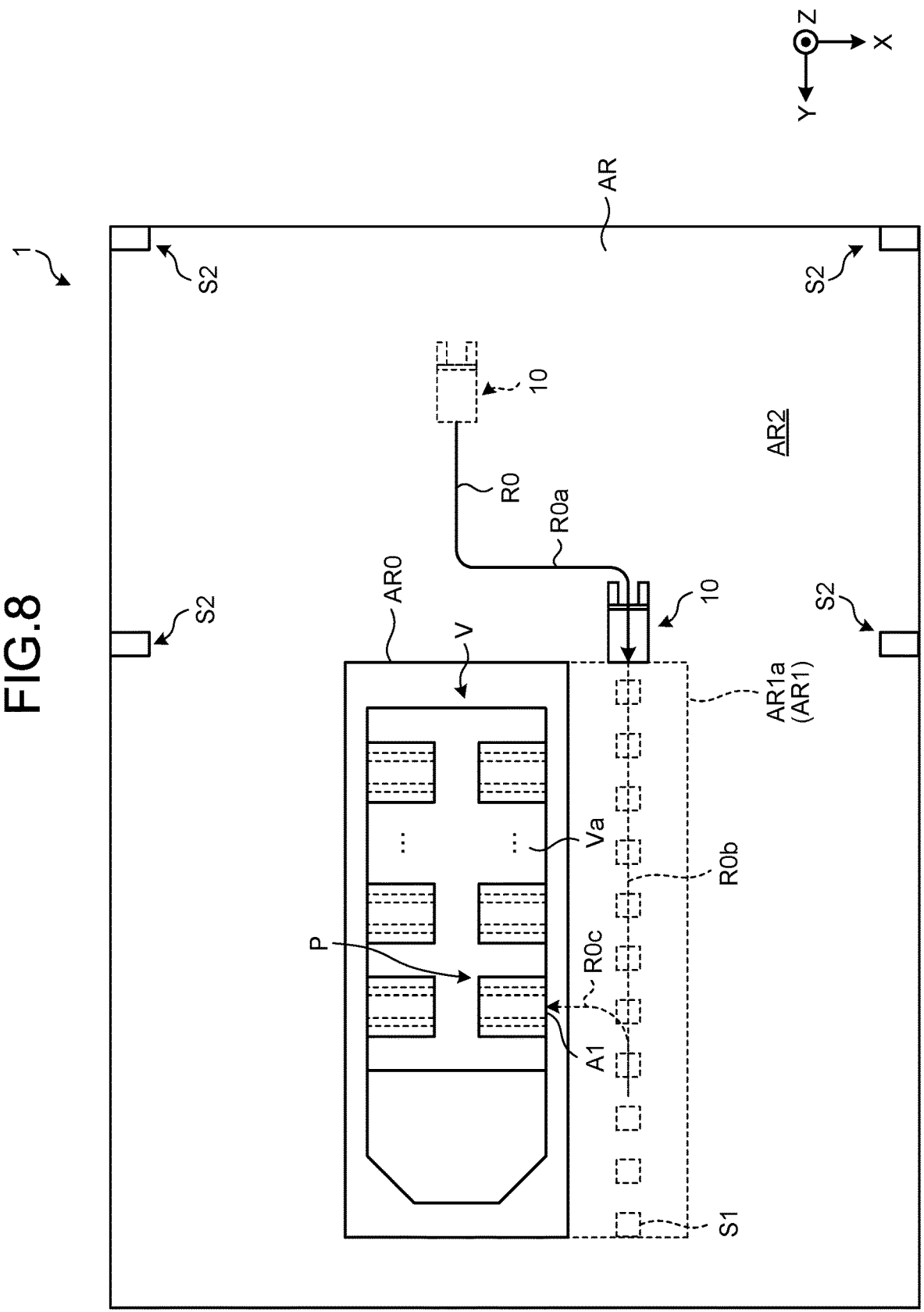
FIG. 8 is a diagram schematically illustrating a global path.

FIG. 8 is a diagram schematically illustrating the global path. As illustrated in FIG. 8, the movement control unit 74 of the control device 28 causes the mobile object 10 to move along the global path R0 acquired by the global path acquisition unit 70. The global path R0 is generated on the assumption that the vehicle V and the target object P in the parking area AR0 are each in a preset reference position and a preset reference posture (for example, a position and a posture with no deviation from the parking area AR0). That is, it can be said that the global path R0 is a track leading to a position (target position A1) where the mobile object 10 is given predetermined position and posture relative to the target object P that is in the reference position and posture, in the vehicle V that is in the reference position and posture in the parking area AR0. It can be said that the target position A1 is in a position and a posture at which the mobile object 10 can pick up the target object P in a case where the vehicle V and the target object P are each in the preset reference position and posture.

In the present embodiment, the global path R0 includes a track R0a, a track R0b, and a track R0c. The track R0a is a track leading to the lateral area AR1a. The track R0b is a track that is connected to the track R0a and that extends in the lateral area AR1a toward the Y direction. The track R0c is a track that is connected to the track R0b and that arrives at the target position A1 from the lateral area AR1a toward a direction opposite to the X direction. It can be said that the track R0c is a track that causes the mobile object 10 to turn so that a traveling direction of the mobile object 10 is switched from the direction toward the Y direction to the direction opposite to the X direction. The track R0c is a track that is turned back from the track R0b, but is not limited thereto, and the track R0c may be any track that arrives at the target position A1 toward the direction opposite to the X direction. The global path R0 is not limited to the track including the track R0a, the track R0b, and the track R0c. For example, the global path R0 does not have to be the track leading to the target position A1, but may be a track including the track R0a and the track R0b without the track R0c, for example.

As described above, the mobile object 10 moves along the global path R0, but the transportation vehicle V or the target object P may deviate from the preset reference position and posture. Thus, in the present embodiment, the positions and the postures of the transportation vehicle V and the target object P are detected, and the path is switched based on the detected positions and the postures. In the present embodiment, the paths are switched from the global path R0 to the first path R1, and the second path R2 in this order.

Detection of Transportation Vehicle in Global Path

The detection control unit 76 acquires detection results of the position and posture of the transportation vehicle V. In the present embodiment, although any method of acquiring the detection results of the position and posture of the transportation vehicle V is adopted, the detection control unit 76 causes the sensor 26 to detect the position and posture of the transportation vehicle V while the mobile object 10 is moving along the global path R0. The detection control unit 76 causes the sensor 26 to detect the parking area AR0 whose position is known; thereby, the sensor 26 detects the transportation vehicle V, which has been parked in the parking area AR0.

For example, in a case of employing a configuration in which the sensor 26 emits a laser beam, the detection control unit 76 causes the sensor 26 to perform the scanning in the lateral (horizontal) direction and causes the sensor 26 to emit a laser beam LT toward the parking area AR0 side while the mobile object 10 is moving along the global path R0. The transportation vehicle V that has been parked in the parking area AR0 reflects the laser beam LT emitted from the sensor 26. The sensor 26 receives light reflected by the transportation vehicle V. The detection control unit 76 acquires a point cloud, which is a set of measurement points, based on the detection results of reflected light that the sensor 26 receives. A measurement point is a point indicating a position (coordinate) at which the laser beam LT is reflected, and a point cloud is a set of points indicating the position at which the laser beam LT is reflected. In the present embodiment, the detection control unit 76 calculates positions (coordinates) of points at which the reflected light is reflected as measurement points based on the detection result of the reflected light. The detection control unit 76 extracts a straight line based on the individual measurement points (point cloud) by using, for example, RANSAC algorithm, and calculates the position and posture of the straight line as the position and posture of the transportation vehicle V. However, any method of calculating the position and posture of the transportation vehicle V based on a detection result of the sensor 26 may be adopted.

Although it is exemplified in FIG. 8 that the transportation vehicle V is detected while the mobile object 10 is moving along the track R0a, the detection control unit 76 may cause the sensor 26 to detect the transportation vehicle V at any timing when the mobile object 10 is positioned on the global path R0. For example, the detection control unit 76 may cause the sensor 26 to detect the transportation vehicle V while the mobile object 10 is moving along the track R0b, or may cause the sensor 26 to detect the transportation vehicle V while the mobile object 10 is stopped at any position on the global path R0.

Hereinafter, the information indicating the position and posture of the transportation vehicle V detected by the sensor 26 is referred to as position and posture information of the transportation vehicle V, as appropriate. It can be said that the detection control unit 76 acquires the position and posture information of the transportation vehicle V detected by the sensor 26. The detection of the position and posture of the transportation vehicle V is not limited to the detection by the sensor 26, and is not also limited to the detection when the mobile object 10 is positioned on the global path R0. For example, a sensor that detects the position and posture of the transportation vehicle V is provided in the facility W, and the detection control unit 76 may acquire the detection result of the position and posture of the transportation vehicle V by the sensor. That is, the position and posture information of the transportation vehicle V, which is acquired by the detection control unit 76, is not limited to the detection result obtained by the sensor 26, but may be the detection result obtained by the sensor provided in the facility W, for example.

Setting of First Path

Figure 9:
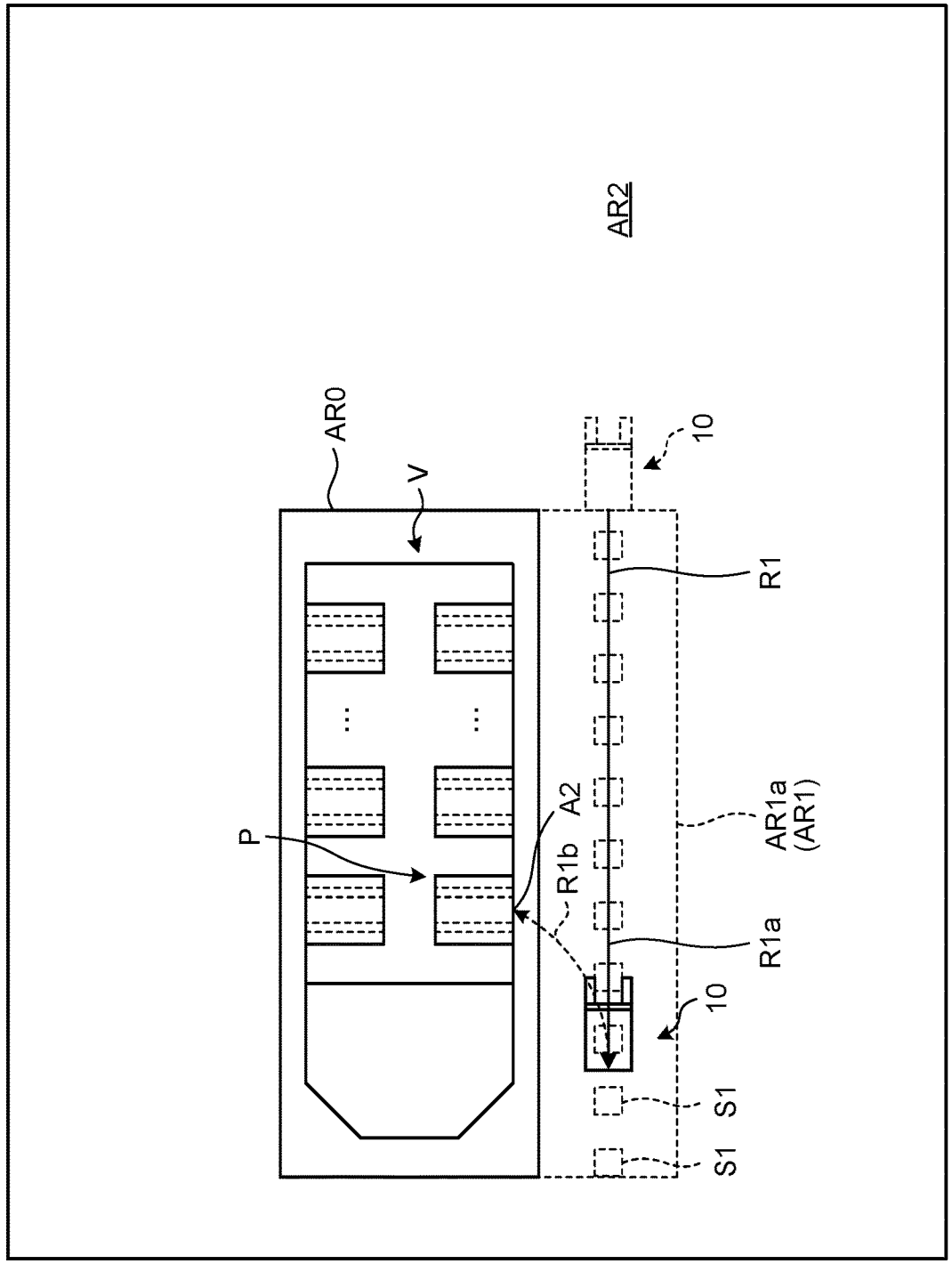
FIG. 9 is a diagram schematically illustrating a first path.

FIG. 9 is a diagram schematically illustrating the first path. The first path acquisition unit 78 acquires information on the first path R1, which is set based on the position and posture information of the transportation vehicle V acquired while the mobile object 10 is moving along the global path R0. The first path R1 is generated assuming that the transportation vehicle V is in the position and posture detected by the sensor 26 and that the target object P is in the preset reference position and posture (for example, the position and the posture with no deviation relative to the transportation vehicle V). It can be said that the first path R1 is a track leading to a position (target position A2) where the mobile object 10 is given predetermined position and posture relative to the target object P that is loaded so as to be in the reference position and posture, in the transportation vehicle V that is in the position and posture detected by the sensor 26. In the present embodiment, it can be said that the target position A2 is the position and posture at which the mobile object 10 can pick up the target object P in a case where the transportation vehicle V is in the position and posture detected by the sensor 26 and the target object P is in the reference position and posture.

Furthermore, it can be said that the first path R1 is a track in which the position of the mobile object 10 when switching from the global path R0 to the first path R1 is a starting position, and the target position A2 is an arrival position. In the present embodiment, the first path R1 includes a track R1*a* and a track R1*b*. The track R1*a* is a track that extends from the starting position to the lateral area AR1*a* toward the Y direction. The track R1*b* is a track that is connected to the track R1*a* and that arrives at the target position A2 from the lateral area AR1*a* toward a direction opposite to the X direction. It can be said that the track R1*b* is a track that causes the mobile object 10 to turn so that a traveling direction of the mobile object 10 is switched from the direction toward the Y direction to the direction opposite to the X direction. In the example in FIG. 9, since the position and posture information of the transportation vehicle V has been acquired at the entrance of the lateral area AR1*a*, the first path R1 is a track with the entrance of the lateral area AR1*a* as the starting position, but the starting position is not limited to the entrance of the lateral area AR1*a*. In addition, the first path R1 is not limited to the track R1*a* and the track R1*b*. For example, in a case where the starting position is at a position at which the mobile object 10 turns back in the lateral area AR1*a*, the first path R1 may include only the track R0*b*.

In the present embodiment, the first path acquisition unit 78, that is, the mobile object 10 itself sets the first path R1 based on the position and posture information of the transportation vehicle V. However, the present embodiment is not limited thereto, a subject other than the mobile object 10 (for example, the information processing device 14) may set the first path R1, and the first path acquisition unit 78 may acquire information on the first path R1 set by the subject via the communication unit 60.

Movement Along First Path

Once the first path acquisition unit 78 obtains the first path R1, the movement control unit 74 switches from the global path R0 to the first path R1 and causes the mobile object 10 to move along the first path R1.

However, it is not necessary to set the first path R1 based on the position and posture information of the transportation vehicle V. For example, the global path R0 may be treated as the first path R1, and the movement control unit 74 may allow the mobile object 10 to move along the global path R0 until to switch from the global path R0 to the second path R2 described later.

Detection of Target Object in First Path

The detection control unit 76 acquires detection results of the position and posture of the target object P. In the present embodiment, although any method of acquiring the detection result of the position and posture of the target object P is adopted, the detection control unit 76 causes the sensor 26 to detect the position and posture of the target object P while the mobile object 10 is moving along the first path R1. The detection control unit 76 causes the sensor 26 to detect the parking area AR0 whose position is known; thereby, the sensor 26 detects the target object P in the parking area AR0.

For example, in a case of employing a configuration in which the sensor 26 emits a laser beam, the detection control unit 76 causes the sensor 26 to perform the scanning in the lateral (horizontal) direction and causes the sensor 26 to emit a laser beam LT toward the parking area AR0 side while the mobile object 10 is moving along the first path R1. The target object P reflects the laser beam LT emitted from the sensor 26. The sensor 26 receives light reflected by the target object P. The detection control unit 76 acquires a point cloud, which is a set of measurement points, based on the detection results of reflected light that the sensor 26 receives. In the present embodiment, the detection control unit 76 calculates positions (coordinates) of points at which the reflected light is reflected as measurement points based on the detection result of the reflected light. The detection control unit 76 extracts a straight line based on the individual measurement points (point cloud) by using, for example, RANSAC algorithm, and calculates the position and posture of the straight line as the position and posture of the target object P. However, any method of calculating the position and posture of the target object P based on a detection result of the sensor 26 may be adopted.

Although it is exemplified in FIG. 9 that the target object P is detected while the mobile object 10 is moving along the track R1*a*, the detection control unit 76 may cause the sensor 26 to detect the target object P at any timing when the mobile object 10 is positioned on the first path R1. For example, the detection control unit 76 may cause the sensor 26 to detect the target object P while the mobile object 10 is moving along the track R1*b*, or may cause the sensor 26 to detect the transportation vehicle V while the mobile object 10 is stopped at any position on the first path R1.

Hereinafter, the information indicating the position and posture of the target object P detected by the sensor 26 is referred to as position and posture information of the target object P, as appropriate. It can be said that the detection control unit 76 acquires the position and posture information of the target object P detected by the sensor 26. The detection of the position and posture of the target object P is not limited to the detection by the sensor 26, and is not also limited to the detection when the mobile object 10 is positioned on the first path R1. For example, a sensor that detects the position and posture of the target object P is provided in the facility W, and the detection control unit 76 may acquire the detection result of the position and posture of the target object P by the sensor. That is, the position and posture information of the target object P, which is acquired by the detection control unit 76, is not limited to the detection result obtained by the sensor 26, but may be the detection result obtained by the sensor provided in the facility W, for example.

Setting of Second Path

Figure 10:
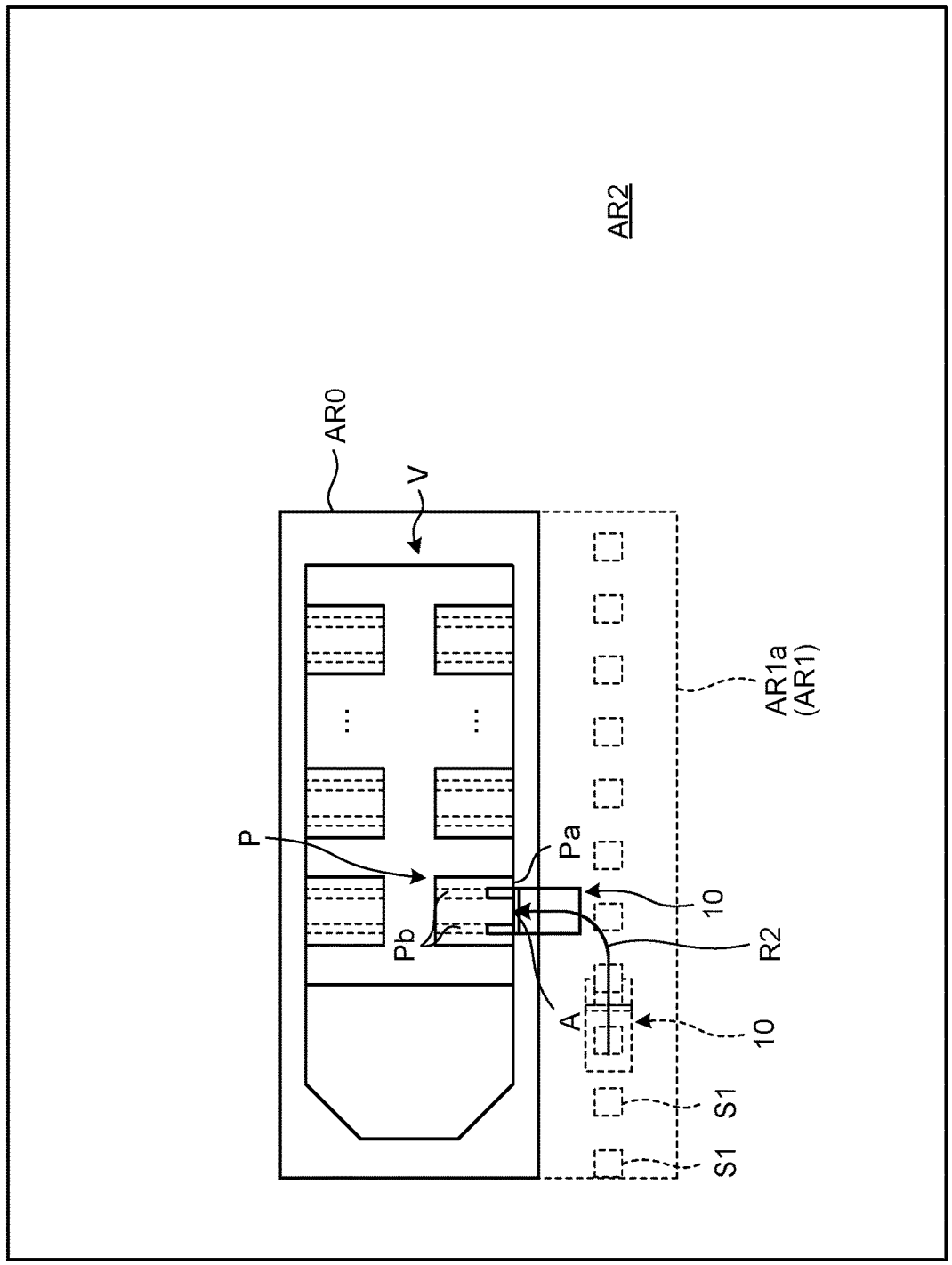
FIG. 10 is a diagram schematically illustrating a second path.

FIG. 10 is a diagram schematically illustrating the second path. The second path acquisition unit 80 acquires information on the second path R2, which is set based on the position and posture information of the target object P acquired while the mobile object 10 is moving along the first path R1. The second path R2 is generated assuming that the target object P is in the position and posture detected by the sensor 26. It can be said that the second path R2 is a track leading to a position (target position A3) where the mobile object 10 is given the predetermined position and posture relative to the target object P that is in the position and posture detected by the sensor 26. In the present embodiment, it can be said that the target position A3 is the position and posture at which the mobile object 10 can pick up the target object P in a case where the target object P is in the position and posture detected by the sensor 26.

Furthermore, it can be said that the second path R2 is a track in which the position of the mobile object 10 when switching from the first path R1 to the second path R2 is a starting position, and the target position A3 is an arrival position. In the present embodiment, the second path R2 is a track in which the mobile object 10 moves toward the opposite direction to the X direction from the starting position in the lateral area AR1a and arrives at the target position A3. It can be said that the second path R2 is a track that causes the mobile object 10 to be turned so that a traveling direction of the mobile object 10 is switched from the direction toward the Y direction to the direction opposite to the X direction. In the example in FIG. 10, the second path R2 is a track in which the position and posture information of the target object P is acquired at a position on the direction Y side with respect to the target object P in the lateral area AR1a, and the position on the direction Y side with respect to the target object P is set as a starting position, and the mobile object 10 turns back from the starting position and arrives at the target position A3. However, the starting position is not limited to the position on the direction Y side with respect to the target object P. For example, the second path R2 may include a track in which the starting position is set to a position on the opposite side to the direction Y with respect to the target object P, and the mobile object moves from the starting position to the turn-back position within the lateral area AR1a toward the Y direction, and a track in which the mobile object 10 moves from the turn-back position toward the opposite direction to the X direction to arrive at the target position A3.

In the present embodiment, the second path acquisition unit 80, that is, the mobile object 10 itself sets the second path R2 based on the position and posture information of the target object P. However, the present embodiment is not limited thereto, a subject other than the mobile object 10 (for example, the information processing device 14) may set the second path R2, and the second path acquisition unit 80 may acquire information on the second path R2 set by the subject via the communication unit 60.

Movement Along Second Path

Once the second path acquisition unit 80 obtains the second path R2, the movement control unit 74 switches from the first path R1 to the second path R2 and causes the mobile object 10 to move along the second path R2.

In the case where the mobile object 10 moves along the second path R2 to arrive at the target position A3, the fork control unit 82 moves the fork 24 to insert the fork 24 into an opening Pb to pick up the target object P. The movement control unit 74 causes the mobile object 10 that has picked up the target object P to be transported to a transporting destination that has been set. Here, in a case where the mobile object 10 is moving along the second path R2, the mobile object 10 may successively detect a position of the opening Pb of the target object P and may move the fork 24 to align the position of the opening Pb with the position of the fork 24 by the feedback control. In this case, for example, the fork control unit 82 may move the fork 24 laterally (side shift) to align the position of the opening Pb with the position of the fork 24.

However, it is not necessary to set the second path R2 based on the position and posture information of the target object P. For example, the first path R1 or the global path R0 may be treated as the second path R2, and the movement control unit 74 may allow the mobile object 10 to move along the first path R1 or the global path R0 to the target object P.

In the present embodiment, the mobile object 10 moves along the track R0b or the track R1a with the opposite side to the fork 24 being forward, and in the track R0c, the track R1b, or the second path R2, the mobile object 10 moves toward the target object P in the opposite direction to the X direction while the mobile object 10 turns back so that the fork 24 side is forward. However, the track R0c, the track R1b, and the second path R2 are not limited to the track of turning back, and may be a track through which the mobile object 10 turns, without turning back, toward the target object P in the opposite direction to the X direction. In this case, for example, the mobile object 10 moves along the track R1a with the fork 24 being forward, and then switches to the track R0c, the track R1b, or the second path R2 while the fork 24 is forward.

In the above explanation, the case in which the mobile object 10 unloads the target object P that has been loaded on the transportation vehicle V is exemplified, but the mobile object 10 may load the target object P on the transportation vehicle V. In this case, the mobile object 10 may set, without setting the second path R2 based on the position and posture of the target object P in the transportation vehicle V, the first path R1 leading to the target position by using a preset position at which the target object P is loaded as the target position, and may approach the target position along the first path R1. For example, the mobile object 10 may cause the sensor 26 to detect a position at which the target object P is loaded in the transportation vehicle V, may set the second path R2 leading to the target position A3 that is a place where the mobile object 10 is given the predetermined position and posture relative to the position at which the target object P is loaded, and may approach the target position A3 along the second path R2. In this case, regarding the position at which the target object P is loaded in the transportation vehicle V, for example, the sensor 26 may detect a wall or the position and posture of other target object P in the storage compartment VA to detect a position separated by a reference distance away from the wall or the other target object P as the position at which the target object P is loaded.

Self-Position Detection

Here, the mobile object 10 moves under the control performed by the movement control unit 74 while detecting its own position (a position of the mobile object 10) by using the self-position acquisition unit 72. In a case where the mobile object 10 is moving in the second area AR2 that is far from the parking area AR0, the mobile object 10 moves while detecting its own position by using the second detection method, and in a case where the mobile object 10 is moving in the first area AR1, which is close to the parking area AR0, the mobile object 10 moves while detecting its own position by using the first detection method of detecting the signs S1. The mobile object 10 moves while detecting its own position in each of the global path R0, the first path R1, and the second path R2. In the present embodiment, since the global path R0 is a path that extends from the second area AR2 to the first area AR1, the self-position acquisition unit 72 detects its own position by using the second detection method in a case where the mobile object 10 moves in a section along the global path R0 within the second area AR2, and detects its own position by using the first detection method in a case where the mobile object 10 moves in a section of the global path R0 within the first area AR1. On the other hand, in the present embodiment, since the first path R1 and the second path R2 are paths within the first area AR1, the self-position acquisition unit 72 detects its own position by using the first detection method in a case where the mobile object 10 moves along the first path R1 and the second path R2. However, at least one of the first path R1 or the second path R2 may extend from the second area AR2 to the first area AR1. In this case, the self-position acquisition unit 72 detects its own position by using the second detection method in a case where the mobile object 10 moves in sections along the first path R1 and the second path R2 within the second area AR2, and detects its own position by using the first detection method in a case where the mobile object moves in sections along the first path R1 and the second path R2 within the first area AR1.

Second Detection Method

The second detection method while the mobile object is moving within the second area AR2 will be described below. FIG. 8 illustrates an example in which the mobile object 10 moves along the global path R0 within the second area AR2. In a case where the mobile object 10 is moving along the global path R0 within the second area AR2, the self-position acquisition unit 72 successively acquires positional information of the mobile object 10 by using the second detection method. The positional information of the mobile object 10 refers to the position and posture of the mobile object 10. Here, the position of the mobile object 10 is a position (coordinates) of the mobile object 10 in the coordinate system of the facility W. The posture of the mobile object 10 is a yaw angle (rotation angle) of the mobile object 10 when viewed from the direction Z orthogonal to the direction X and the direction Y, with the X direction being 0°. The position in the present embodiment, unless otherwise specified, may refer to coordinates in the coordinate system of the facility W, and similarly, the posture in the present embodiment, unless otherwise specified, may refer to the yaw angle when viewed from direction Z, with the X direction being 0°. Although the case where the mobile object 10 moves along the global path R0 within the second area AR2 is illustrated in FIG. 8 as an example, the second detection method is similarly used to acquire the positional information of the mobile object 10 even in a case where the mobile object 10 moves along the first path R1 or the second path R2 within the second area AR2, as described above.

The second detection method may be any method different from the first detection method of detecting the signs S1 described below, and may be a method as long as the positional information of the mobile object 10 is acquired. In the example of the present embodiment, the facility W is provided with a plurality of detection objects S2 each of which can reflect a laser beam, and in the second detection method, the self-position acquisition unit 72 acquires the positional information of the mobile object 10 based on light reflected by the detection objects S2. Specifically, the self-position acquisition unit 72 causes a position detection sensor provided in the mobile object 10 to emit a laser beam toward each of the detection objects S2. Each of the detection objects S2 reflects the laser beam emitted from the position detection sensor, and the position detection sensor receives light reflected by each of the detection objects S2. The self-position acquisition unit 72 calculates the position and posture of the mobile object 10 based on at least one of a timing when the position detection sensor receives the reflected light and a direction where the reflected light travels to acquire the positional information of the mobile object 10. In the example in FIG. 8, there are four detection objects S2, but any number of the detection objects S2 may be adopted. A position of each of the detection objects S2 is not limited to the example in FIG. 8, and each of the detection objects S2 may be provided at any position different from each of the signs S1. A sensor for detecting a position of the mobile object 10 used in the second detection method may be any sensor capable of emitting and receiving a laser beam, and for example, the sensor 26 may be used as the position detection sensor.

The second detection method is not limited to such a method of using the detection objects S2, and any method different from the first detection method may be adopted. For example, a self-position estimation technique such as simultaneous localization and mapping (SLAM) may be used as the second detection method. In SLAM, for example, the movement control unit 74 acquires map information of the facility W, and acquires the positional information of the mobile object 10 based on a positional relationship between a position of a reference object (for example, a post) in the facility W in the map information and a position of a reference object detected by the sensor (for example, the sensor 26), that is, by using a map matching technique.

In a case where the mobile object 10 is moving within the second area AR2, the mobile object 10 moves along a path within the second area AR2 (the global path R0 in the example in FIG. 8) under the control of the movement control unit 74 based on the positional information of the mobile object 10 acquired by the self-position acquisition unit 72 with the second detection method. For example, the movement control unit 74 estimates the position and posture of the mobile object 10 by odometry and causes the mobile object 10 to move so that the estimated position and estimated posture of the mobile object 10 are directed along the path within the second area AR2. Then, once the self-position acquisition unit 72 acquires the positional information of the mobile object 10, the movement control unit 74 corrects the estimated position and estimated posture of the mobile object 10 based on the position and posture of the mobile object 10 acquired by the self-position acquisition unit 72, and causes the mobile object 10 to continuously move so that the corrected estimated position and estimated posture of the mobile object 10 is directed along the path within the second area AR2. The movement control unit 74 corrects the estimated position and estimated posture of the mobile object 10 each time when the self-position acquisition unit 72 acquires positional information of the mobile object 10.

Switching from Second Detection Method to First Detection Method

The self-position acquisition unit 72 switches the self-position detection method between the second detection method and the first detection method in a case where the mobile object 10 arrives at a boundary position between the second area AR2 and the first area AR1, that is, a case where the estimated position of the mobile object 10 arrives at the boundary position. In the description of the present embodiment, since the mobile object 10 is moving from the second area AR2 to the first area AR1, the self-position acquisition unit 72 switches the self-position detection method from the second detection method to the first detection method when the mobile object 10 arrives at the boundary position between the second area AR2 and the first area AR1. In a case where the mobile object 10 is moving from the first area AR1 to the second area AR2, the self-position acquisition unit 72 switches the self-position detection method from the first detection method to the second detection method when the mobile object 10 arrives at the boundary position.

In the present embodiment, since the boundary position is predefined, it is determined that the mobile object 10 has arrived at the boundary position in a case where the mobile object 10 arrives at a predefined position, that is, in a case where the estimated position of the mobile object 10 by the self-position acquisition unit 72 matches the predefined position, and the second detection method and the first detection method are switched from each other. However, the determination of whether the mobile object 10 has arrived at the boundary position is not limited thereto, and for example, there is no need to determine the boundary position in advance. In this case, for example, in a case of making the determination to switch from the second detection method to the first detection method, the self-position acquisition unit 72 may determine that the mobile object 10 has arrived at the boundary position in a case where detection accuracy in the first detection method is equal to or less than a threshold, and may switch from the second detection method to the first detection method. For example, the self-position acquisition unit 72 may determine that detection accuracy in the second detection method is equal to or less than the threshold and may switch from the second detection method to the first detection method in a case where at least one of the following conditions is satisfied: the intensity of light reflected by each detection object S2 is equal to or less than a predetermined value; and the number of the detection objects S2 through which reflected light could be received is equal to or less than a predetermined number. Similarly, for example, in a case of making the determination to switch from the first detection method to the second detection method, the self-position acquisition unit 72 may determine that the mobile object 10 has arrived at the boundary position in a case where detection accuracy in the first detection method is equal to or less than the threshold, and may switch from the first detection method to the second detection method. For example, the self-position acquisition unit 72 may determine that the detection accuracy in the first detection method is equal to or less than the threshold and may switch from the first detection method to the second detection method in a case where the self-position acquisition unit 72 is no longer possible to acquire positional information of each of the signs S1 from image data imaged by the sensor 27.

First Detection Method

The first detection method while the mobile object is moving within the first area AR1 will be described below. FIG. 9 illustrates an example in which the mobile object 10 moves within the lateral area AR1a of the first area AR1 in the Y direction. In a case where the mobile object 10 is moving within the lateral area AR1a in the Y direction, the self-position acquisition unit 72 successively acquires positional information of the mobile object 10 by using the first detection method. Although the case where the mobile object 10 moves along the first path R1 within the lateral area AR1a in the Y direction is illustrated in FIG. 9 as an example, the first detection method is similarly used to acquire the positional information of the mobile object 10 even in a case where the mobile object 10 moves along the global path R0 or the second path R2 within the lateral area AR1a in the Y direction.

In the first detection method, the self-position acquisition unit 72 causes the sensor 27 to detect at least one of the signs S1 to acquire the positional information of the mobile object 10. Specifically, the self-position acquisition unit 72 causes the sensor 27 to image at least one of the signs S1 that are provided on the ceiling of the lateral area AR1a to be aligned in the Y direction. The self-position acquisition unit 72 reads out, from the image data of the sign S1 imaged by the sensor 27, the positional information of the sign S1 to acquire the positional information of the sign S1. The self-position acquisition unit 72 calculates the position and posture of the mobile object 10 based on the positional information of each of the signs S1 to acquire the positional information of the mobile object 10. For example, the self-position acquisition unit 72 calculates the position and posture of the mobile object 10 with respect to the signs S1 based on the image imaged by the sensor 27, and calculates the position and posture of the mobile object 10 from the position and posture of the mobile object 10 with respect to the signs S1 and the positional information of the signs S1. The self-position acquisition unit 72 can calculate the position and posture of the mobile object 10 with respect to the signs S1 based on the position and size of each of the signs S1 in the imaged image.

In a case where the mobile object 10 is moving within the lateral area AR1a in the Y direction, the self-position acquisition unit 72 causes the mobile object 10 to successively detect the signs S1, thereby successively acquiring the positional information of the mobile object 10. For example, the movement control unit 74 estimates the position and posture of the mobile object 10 by odometry and causes the mobile object 10 to move so that the estimated position and estimated posture of the mobile object 10 are directed along the path within the lateral area AR1a toward the Y direction. Then, once the self-position acquisition unit 72 acquires the positional information of the mobile object 10, the movement control unit 74 corrects the estimated position and estimated posture of the mobile object 10 based on the position and posture of the mobile object 10 acquired by the self-position acquisition unit 72, and causes the mobile object 10 to continuously move so that the corrected estimated position and estimated posture of the mobile object 10 is directed along the path toward the Y direction within the lateral area AR1a. The movement control unit 74 corrects the estimated position and estimated posture of the mobile object 10 each time when the self-position acquisition unit 72 acquires positional information of the mobile object 10.

A plurality of the signs S1 are provided along the Y direction, which is a direction in which the mobile object 10 moves. Therefore, since the self-position acquisition unit 72 can switch a sign S1 to be detected by the sensor 27 to a sign S1 that is closer to the mobile object 10 as the mobile object 10 moves in the Y direction, the positional information of the mobile object 10 can be acquired with high accuracy.

In a case where the movement control unit 74 causes the mobile object 10 to move within the lateral area AR1*a* in the Y direction, the movement control unit 74 preferably causes the mobile object 10 along the line L that connects the signs S1 to each other. In this case, the self-position acquisition unit 72 causes the sensor 27 to sequentially detect (image) the line L in advance, and acquires positional information of the line L from an image imaged by the sensor 27. The movement control unit 74 causes the mobile object 10 to move toward the Y direction so that a distance between the line L and the estimated position of the mobile object 10 in the direction orthogonal to the Y direction (herein, in the X direction), which is a direction where the mobile object 10 travels, is within a predetermined range. According to this, the mobile object 10 can move properly in the Y direction without deviation in the X direction. For example, in a case where a posture angle of the transportation vehicle V can be detected, the movement control unit 74 may cause the mobile object 10 to travel so that the mobile object 10 is parallel to the side surface of the transportation vehicle V according to the posture angle of the transportation vehicle V.

As described above, the self-position detection in the case where the mobile object 10 moves within the lateral area AR1*a* in the Y direction is described, but self-position detection in a case where the mobile object 10 moves to the opposite side to the X direction within the lateral area AR1*a* toward the target object P is also performed by using the first detection method in the same way. That is, as illustrated in FIG. 10, while the mobile object 10 moves to the opposite side to the X direction toward the target object P, the self-position acquisition unit 72 causes the mobile object 10 to successively detect the signs S1 provided on the ceiling of the lateral area AR1*a*, thereby successively acquiring the positional information of the mobile object 10. For example, the movement control unit 74 estimates the position and posture of the mobile object 10 by odometry and causes the mobile object 10 to move so as to be along the path (second path R2 in the example in FIG. 10) through which the estimated position and estimated posture of the mobile object 10 is directed toward the target object P. Then, once the self-position acquisition unit 72 acquires the positional information of the mobile object 10, the movement control unit 74 corrects the estimated position and estimated posture of the mobile object 10 based on the position and posture of the mobile object 10 acquired by the self-position acquisition unit 72, and causes the mobile object 10 to continuously move so that the corrected estimated position and estimated posture of the mobile object 10 is directed along the path toward the target object P. The movement control unit 74 corrects the estimated position and estimated posture of the mobile object 10 each time when the self-position acquisition unit 72 acquires positional information of the mobile object 10.

Processing Flow

Figure 11:
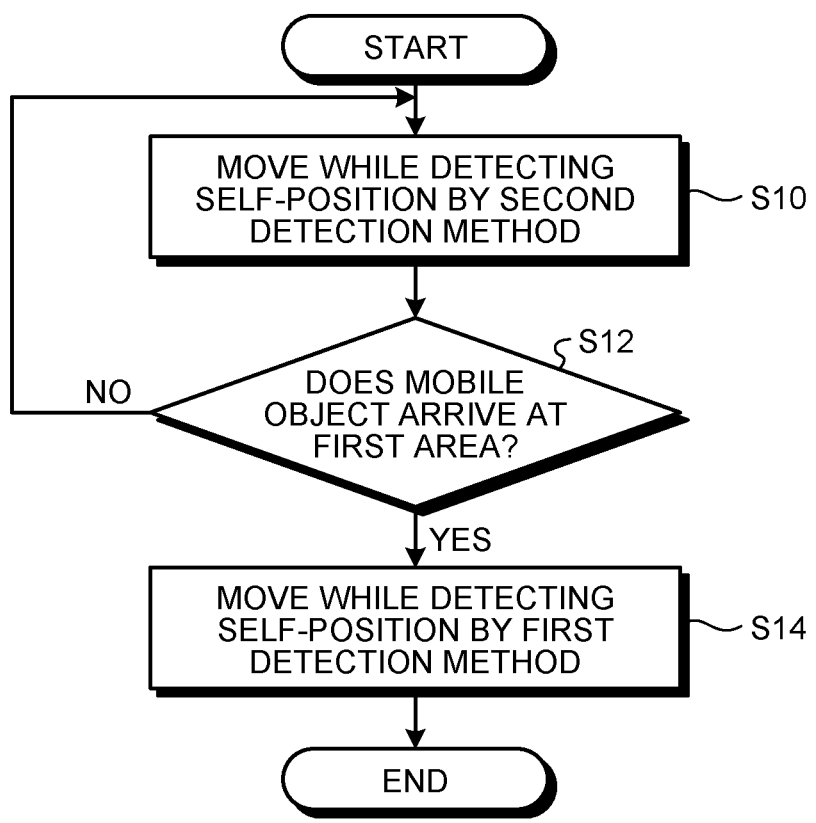
FIG. 11 is a flowchart illustrating a processing flow of self-position detection according to the present embodiment.

Next, a processing flow of the self-position detection will be described. FIG. 11 is a flowchart illustrating a processing flow of the self-position detection according to the present embodiment. As illustrated in FIG. 11, in a case where the mobile object 10 is positioned within the second area AR2, while the self-position acquisition unit 72 causes the mobile object 10 to acquire positional information of the mobile object 10 by the second detection method, the mobile object 10 moves along a set path (for example, the global path R0) based on the positional information of the mobile object 10 under the control performed by the movement control unit 74 (step S10). In a case where the mobile object 10 arrives at the first area AR1 (Yes at step S12), the mobile object 10 switches the self-position detection method from the second detection method to the first detection method, and thereafter, while the self-position acquisition unit 72 causes the mobile object 10 to acquire positional information of the mobile object 10 by the first detection method (by detecting the signs S1), the mobile object 10 moves along a set path (for example, the first path R1 or the second path R2) based on the positional information of the mobile object 10 under the control performed by the movement control unit 74 (step S14). For example, in a case where the mobile object 10 is positioned within the lateral area AR1*a* in the first area AR1, while the self-position acquisition unit 72 causes the mobile object 10 to acquire positional information of the mobile object 10 by the first detection method (by detecting the signs S1), the mobile object 10 moves within the lateral area AR1*a* in the Y direction based on the positional information of the mobile object 10 under the control performed by the movement control unit 74. In a case where the mobile object 10 does not arrive at the first area AR1 (No at step S12), the processing returns to step S10, and the self-position detection and movement within the second area AR2 are continuously carried out by the second detection method.

As described above, the case where the mobile object 10 moves toward the transportation vehicle V to pick up the target object P that has been loaded on the transportation vehicle V or to drop the target object P from the transportation vehicle V was exemplified. However, the above processing can also be applied to a case where the mobile object 10 moves from the transportation vehicle V to the first area AR1 after dropping the target object P on the transportation vehicle V or a case where the mobile object 10 moves from the transportation vehicle V to the first area AR1 after picking up the target object P from the transportation vehicle V. That is, for example, the mobile object 10 is positioned within the first area AR1 at the time when the mobile object 10 drops the target object P on or picks up the target object P from the transportation vehicle V. With the mobile object 10 being positioned within the first area AR1, while the mobile object 10 acquires positional information of the mobile object 10 by the first detection method (by detecting the signs S1), the mobile object 10 moves toward the second area AR2 under the control performed by the movement control unit 74. In addition, in a case of arriving at the second area AR2, the mobile object 10 switches the self-position detection method from the first detection method to the second detection method, and while the self-position acquisition unit 72 causes the mobile object 10 to acquire positional information of the mobile object 10 by the second detection method, the mobile object 10 continuously moves under the control performed by the movement control unit 74.

As described above, in the present embodiment, the self-position detection method is switched according to the position of the mobile object 10, but it is not necessary to switch the self-position detection method. For example, the mobile object 10 may detect its own position by only the first detection method, without the second detection method.

As described above, while the mobile object 10 detects the S1 signs aligned along the Y direction on the ceiling of the lateral area AR1*a* on the side of the parking area AR0 to detect its own position, the mobile object 10 moves within the lateral area AR1*a* along the Y direction based on its own position detected. By providing the signs S1 on the ceiling of the lateral area AR1*a*, the signs S1 can be properly detected without disturbed by the transportation vehicle V or the like, even in a case where the mobile object 10 moves close to the parking area AR0, and the position of the mobile object 10 can be properly detected in the vicinity of the parking area. In addition, since the signs S1 are disposed within the lateral area AR1a along the Y direction, which is a direction where the mobile object 10 travels, the self-position acquisition unit 72 can switch a sign S1 to be detected by the sensor 27 to a sign S1 that is closer to the mobile object 10 as the mobile object 10 moves toward the Y direction. Therefore, the positional information of the mobile object 10 can be acquired with high accuracy. In the present embodiment, in the first area AR1, which is close to the parking area AR0, the self-position is detected by the first detection method using the signs S1, and in the second area AR2, which is far from the parking area AR0, the self-position is detected by the second detection method without using the signs S1. Therefore, the positional information of the mobile object 10 can be acquired with high accuracy according to the position of the mobile object 10.

Other Examples of Signs

Next, other examples of the signs S1 will be described.

Figure 12:
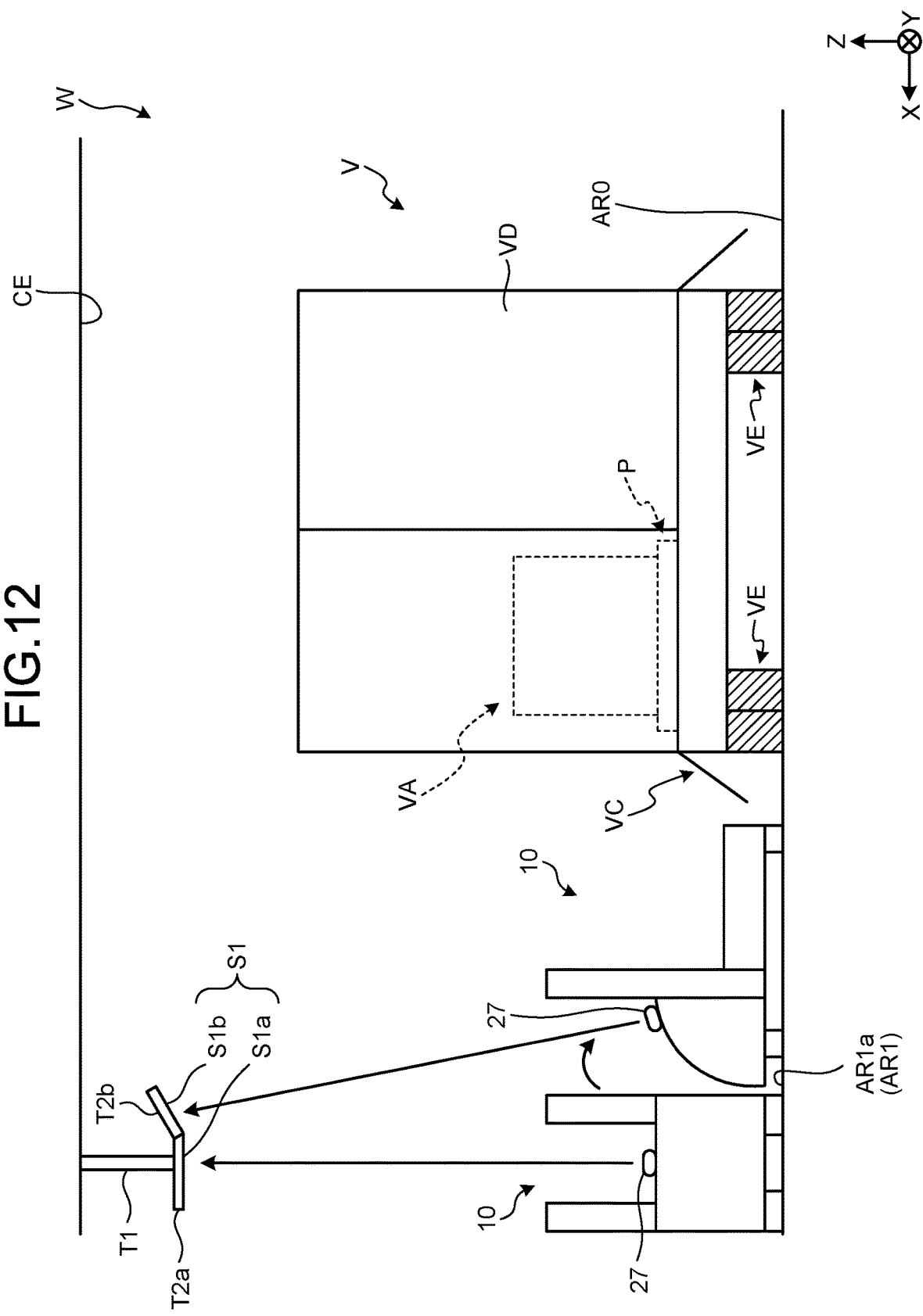
FIG. 12 is a diagram schematically illustrating another example of a shape of a sign.

FIGS. 12 and 13 are diagrams schematically illustrating other examples of shapes of the signs. As illustrated in FIG. 12, the signs S1 may include a first sign S1a and a second sign S1b adjacent to the first sign S1a. The first sign S1a is a sign (for example, a mark) including the positional information of the signs S1 and is disposed on a first plane parallel to the first area AR1 (lateral area AR1a) directly below itself, that is, parallel to a floor surface directly below. In the example in FIG. 12, the first sign S1a is provided on a surface (first surface) of the plate portion T2a opposite to the Z direction. The plate portion T2a has a surface opposite to the Z direction, which is parallel to the floor surface directly below. On the other hand, the second sign S1b is a sign (for example, a mark) including the positional information of the signs S1 and is disposed on a second plane inclined relative to the first area AR1 (lateral area AR1a) directly below itself, that is, inclined relative to the floor surface directly below. Further specifically, the second sign S2a is positioned on the opposite side to the X direction (parking area AR0 side) with respect to the first sign S1a. The second surface is inclined, as directed toward the opposite side to the X direction (parking area AR0 side), relative to the first area AR1 (lateral area AR1a) directly below itself, that is, inclined relative to the floor surface directly below, in the Z direction side (vertically upward). In the example in FIG. 12, the second sign S1b is provided on a surface (second surface) of the plate portion T2b opposite to the Z direction. The plate portion T2a has a surface opposite to the Z direction, which is inclined, as directed toward the opposite side to the X direction, relative to the floor surface directly below, in the Z direction side.

As illustrated in FIG. 12, by providing the first sign S1a and the second sign S1b, it is possible to detect the self-position by detecting the first sign S1a in a case where the mobile object 10 moves within the lateral area AR1a in the Y direction, and to detect the self-position by detecting the second sign S1b in a case where the mobile object 10 turns to the opposite side to the X direction and moves toward the target object P; thereby it is possible to detect its own position in each movement with high accuracy. That is, since the first sign S1a is provided on the plane parallel to the floor surface, the inclination angle of the optical axis of the sensor 27 relative to the center axis of the first sign S1a becomes smaller in a case where the mobile object 10 moves within the lateral area AR1a in the Y direction. Thus, the first sign S1a appears larger in the imaged image, so that it is possible to detect the first sign S1a properly and detect the self-position with high accuracy. In addition, since the second sign S1b is provided on the plane inclined, as directed toward the parking area AR0, in the Z direction side, the inclination angle of the optical axis of the sensor 27 relative to the center axis of the second sign S1b becomes smaller in a case where the mobile object 10 turns and moves to the parking area AR0 side. Thus, the second sign S1b appears larger in the imaged image, so that it is possible to detect the second sign S1b properly and detect the self-position with high accuracy.

In the example in FIG. 12, the first sign S1a was formed on a surface parallel to the floor surface, but the present embodiment is not limited thereto. For example, as illustrated in the example in FIG. 13, the first sign S1a may be provided on a surface that is inclined, as directed toward the opposite side to the parking area AR0, in the Z direction side.

FIG. 14 is a diagram schematically illustrating the other examples of the signs. As illustrated in FIG. 14, the first area AR1 (lateral area AR1a) may be inclined, as directed toward the Y direction, to the opposite side to the Z direction (vertically downward) because of draining water from the floor surface to the outside, for example. The ceiling CE of the first area AR1 (lateral area AR1a) may be inclined, as directed toward the Y direction, to the Z direction side (vertically upward). Even in such a case, the plurality of signs S1 are preferably disposed along the Y direction on the plane that is inclined, as directed toward the Y direction, to the opposite side to the Z direction (vertically downward) so that the signs S1 are parallel to the first area AR1 (lateral area AR1a). That is, in such a case, it can be said that the surface of the plate portion T2 opposite to the Z direction is preferably disposed to be inclined, as directed toward the Y direction, to the opposite side to the Z direction (vertically downward) so as to be parallel to the first area AR1 (lateral area AR1a).

Advantageous Effects

As described above, the control method for the mobile object 10 according to the present embodiment is a method of controlling the mobile object 10 that automatically moves, in which the signs S1 each of which indicates a position are provided on the ceiling CE of the lateral area AR1a on the X direction (first direction) side with respect to the parking area AR0 where the transportation vehicle V is parked, along the Y direction (second direction) that intersects the X direction and that is along the parking area AR0. This control method includes a step of causing the mobile object 10 to detect at least one of the signs S1 to acquire positional information of the mobile object 10, a step of causing the mobile object 10 to move toward the Y direction (second direction) in the lateral area AR1a based on the positional information of the mobile object 10, and a step of causing the mobile object 10 to turn and move toward the opposite side to the X direction (first direction) after causing the mobile object 10 to move toward the Y direction (second direction) in the lateral area AR1a, thereby the mobile object 10 moving toward the parking area AR0. By providing the signs S1 on the ceiling of the lateral area AR1a, the signs S1 can be properly detected without disturbed by the transportation vehicle V or the like, even in a case where the mobile object 10 moves close to the parking area AR0, and the position of the mobile object 10 can be properly detected in the vicinity of the parking area AR0. In addition, since the signs S1 are disposed within the lateral area AR1a along the Y direction, which is a direction where the mobile object 10 travels, the self-position acquisition unit 72 can switch a sign S1 to be detected by the sensor 27 to a sign S1 that is closer to the mobile object 10 as the mobile object 10 moves toward the Y direction. Therefore, the positional information of the mobile object 10 can be acquired with high accuracy.

In this control method, in a case where the mobile object 10 is positioned within the first area AR1 including the lateral area AR1a, the mobile object 10 moves based on the positional information of the mobile object 10 acquired by the first detection method by which the sign S1 is detected. On the other hand, in a case where the mobile object 10 is positioned within the second area AR2 farther from the parking area AR0 than the first area AR1 is, the mobile object 10 moves based on the positional information of the mobile object 10 acquired by the second detection method different from the first detection method. As described above, in the first area AR1, which is close to the parking area AR0, the self-position is detected by the first detection method using the signs S1, and in the second area AR2, which is far from the parking area AR0, the self-position is detected by the second detection method without using the signs S1; thereby the positional information of the mobile object 10 can be acquired with high accuracy according to the position of the mobile object 10.

In this control method, the second detection method and the first detection method are switched from each other in a case where the mobile object 10 arrives at the boundary between the first area AR1 and the second area AR2. By switching the detection method triggered by the mobile object 10 arriving at the predefined boundary position, the positional information of the mobile object 10 can be acquired with high accuracy according to the position of the mobile object 10.

In the second detection method, by emitting the laser beam from the mobile object 10 toward the detection objects S2 provided on the location separated from the signs S1 and receiving reflected light of the laser beam, which is reflected by the detection objects S2, the positional information of the mobile object 10 is obtained, and in this control method, in a case where the detection accuracy of the received reflected light is equal to or less than the threshold, the second detection method is switched to the first detection method. By switching the detection method triggered by the detection accuracy being equal to or less than the threshold, the positional information of the mobile object 10 can be acquired with high accuracy according to the position of the mobile object 10.

This control method further includes a step of detecting the position and posture of the transportation vehicle V in the parking area AR0, and a step of setting the first path R1 toward the transportation vehicle V based on the position and posture of the transportation vehicle V. In this control method, the first path R1 is set based on the position and posture of the transportation vehicle V. Therefore, even though the parking position of the transportation vehicle V has been deviated, the mobile object 10 can approach the transportation vehicle V properly.

This control method further includes a step of detecting the position and posture of the target object P disposed in the transportation vehicle V, a step of setting the second path R2 leading to the target position A3 where predetermined position and posture relative to the target object P are given based on the position and posture of the target object P, and a step of switching from the first path R1 to the second path R2 and causing the mobile object 10 to move along the second path R2 based on the detected position of the mobile object 10. In this control method, the second path R2 is set based on the position and posture of the target object P. Therefore, even though the position of the target object P has been deviated, the mobile object 10 can approach the target object P properly.

The line L connecting the signs S1 to each other is provided on the ceiling CE of the lateral area AR1a, and in the step of moving the mobile object 10, the mobile object 10 moves along the line L within the lateral area AR1a. Since the mobile object 10 moves along the line L, the mobile object 10 can properly move toward the Y direction within the lateral area AR1a.

The signs S1 include the first sign S1a disposed on the first plane parallel to the floor surface in the lateral area AR1a, and the second sign S1b provided adjacent to the first sign S1a and provided on the second plane inclined, as directed toward the parking area AR0, vertically upward relative to the floor surface in the lateral area AR1a. Therefore, it possible to detect the self-position with high accuracy in both the case where the mobile object 10 moves within the lateral area AR1a in the Y direction and the case where the mobile object 10 moves while turning toward the opposite side to X direction to be directed toward the target object P.

The mobile object 10 automatically moves, and includes the self-position acquisition unit 72 that acquires positional information of the mobile object 10 by detecting at least one of the signs S1 provided on the ceiling CE of the lateral area AR1a on the X direction side with respect to the parking area AR0 where the transportation vehicle V is parked, along the Y direction intersecting the X direction along the parking area AR0, and the movement control unit 74 that causes the mobile object 10 to move toward the Y direction in the lateral area AR1a based on the positional information of the mobile object 10. After the mobile object 10 moves toward the Y direction (second direction) in the lateral area AR1a, the movement control unit 74 causes the mobile object 10 to turn and move toward the opposite side to the X direction (first direction), thereby the mobile object 10 moving toward the parking area AR0. The mobile object 10 can properly detect its own position in the vicinity of the parking area AR0.

The movement control system 1 includes the mobile object 10 and the signs S1. Therefore, the movement control system 1 can properly detect the position of the mobile object 10 in the vicinity of the parking area AR0.

As described above, the embodiments of the present disclosure are exemplified, but the embodiments are not limited by the contents of the present embodiment. The above described components include components which can be easily assumed by those skilled in the art and components which are substantially identical, that is, the so-called scope of equivalents. Furthermore, the above described components can be combined as appropriate. Furthermore, various omissions, substitutions, or modifications of components can be made without departing from the gist of the above described embodiments.

REFERENCE SIGNS LIST

10 Mobile object
27 Sensor
70 Global path acquisition unit
72 Self-position acquisition unit
74 Movement control unit
76 Detection control unit
78 First path acquisition unit
80 Second path acquisition unit
AR0 Parking area AR1 First area
AR1a Lateral area
AR2 Second area
P Target object
R0 Global path
R1 First path
R2 Second path
S1 Sign
V Transportation Vehicle

The invention claimed is:

1. A control method for a mobile object that automatically moves on a floor surface of a logistics management facility in a situation where a plurality of signs each of which indicates a position are provided,
the floor surface having a parking area, which extends in a first direction (X direction) and a second direction (Y direction) intersecting the first direction and in which a transportation vehicle is parked, and a lateral area, which is adjacent to the parking area along the second direction and in which the moving object approaches the parking area,
the signs begin provided on a ceiling of the lateral area along the second direction,
each of the signs including: a first sign disposed parallel to a floor surface in the lateral area so as to face downward; and a second sign adjacent to the first sign and closer to the parking area than the first sign, the second sign being inclined upward with respect to the first sign so as to face obliquely downward,
the control method comprising:
acquiring first positional information of the mobile object by causing the mobile object to detect at least one of the first signs,
acquiring second positional information of the mobile body by causing the mobile object to detect at least one of the second signs;
causing the mobile object to move within the lateral area in the second direction based on the first positional information of the mobile object; and
causing the mobile object to turn and move from the lateral area toward the parking area in the first direction based on the second positional information, wherein
a line connecting the signs is provided on the ceiling of the lateral area, and
causing the mobile object to turn and move from the lateral area toward the parking area in the first direction includes causing the mobile object to move along the line in the lateral area.

2. The control method according to claim 1, further comprising:
when the mobile object is positioned in a first area including the parking area and the lateral area, causing the mobile object to move based on the positional information of the mobile object acquired by a first detection method of detecting the signs; and
when the mobile object is positioned in a second area other than the first area on the floor surface of the logistics facility, causing the mobile object to move based on positional information of the mobile object acquired by a second detection method different from the first detection method.

3. The control method according to claim 2, wherein the second detection method and the first detection method are switched from each other when the mobile object arrives at a boundary between the first area and the second area.

4. The control method according to claim 2, wherein the second detection method is a method of
emitting a laser beam from the mobile object toward a detection object provided on a location separated from the signs, and
receiving reflected light of the laser beam, which is reflected by the detection object, to acquire positional information of the mobile object, and
the control method further comprises switching the second detection method to the first detection method when detection accuracy of the received reflected light is equal to or less than a threshold.

5. The control method according to claim 1, further comprising:
detecting a position and an orientation of the transportation vehicle present in the parking area; and
setting a first path along which the mobile object is to be moved within the lateral area in the second direction, based on the position and posture of the transportation vehicle.

6. The control method according to claim 5, the method further comprising:
detecting a position and a posture of a target object disposed in the transportation vehicle;
setting a second path along which the mobile object is to be moved from the lateral area toward the target object based on the position and posture of the target object; and
switching from the first path to the second path to cause the mobile object to move along the second path based on the detected position of the mobile object.

7. A mobile object that automatically moves on a floor surface of a logistics facility in a situation where a plurality of signs each of which indicates a position are provided,
the floor surface having a parking area, which extends in a first direction and a second direction intersecting the first direction and in which a transportation vehicle is parked, and a lateral area, which is adjacent to the parking area along the second direction and in which the mobile object approaches the parking area,
the signs being provided on a ceiling of the lateral area along the second direction,
each of the signs including: a first sign disposed parallel to a floor surface in the lateral area so as to face downward; and a second sign adjacent to the first sign and closer to the parking area than the first sign, the second sign being inclined upward with respect to the first sign so as to face obliquely downward,
the mobile object, comprising:
a self-position acquisition unit configured to acquire first positional information of the mobile object by detecting at least one of the first signs, and
acquire second positional information of the mobile object by detecting at least one of the second signals; and
a movement control unit configured to cause the mobile object to move within the lateral area in the second direction based on the first positional information of the mobile object, and
cause the mobile object to turn and move from the lateral area toward the parking area in the first direction based on the second positional information, wherein
a line connecting the signs is provided on the ceiling of the lateral area, and
the movement control unit causes the mobile object to turn and move from the lateral area toward the parking area in the first direction includes causing the mobile object to move along the line in the lateral area.

8. A movement control system comprising:
the mobile object according to claim 7; and
the signs.

9. A non-transitory computer-readable storage medium storing a computer program for causing a computer to execute a control method for a mobile object that automatically moves in a situation where a plurality of signs each of which indicates a position are provided,
- the floor surface having a parking area, which extends in a first direction and a second direction intersecting the first direction and in which a transportation vehicle is parked, and a lateral area, which is adjacent to the parking area along the second direction and in which the mobile object approaches the parking area,
- the signs being provided on a ceiling of the lateral area along the second direction,
- each of the signs including: a first sign disposed parallel to a floor surface in the lateral area so as to face downward; and a second sign adjacent to the first sign and closer to the parking area than the first sign, the second sign being inclined upward with respect to the first sign so as to face obliquely downward,
- the computer program comprising:
- acquiring first positional information of the mobile object by causing the mobile object to detect at least one of the first signs;
- acquiring second positional information of the mobile body by causing the mobile object to detect at least one of the second signs;
- causing the mobile object to move within the lateral area in the second direction based on the first positional information of the mobile object; and
- causing the mobile object to turn and move from the lateral area toward the parking area in the first direction based on the second positional information, wherein
- a line connecting the signs is provided on the ceiling of the lateral area, and
- the computer program further comprises causing the mobile object to turn and move from the lateral area toward the parking area in the first direction includes causing the mobile object to move along the line in the lateral area.

* * * * *